United States Patent
Salomon et al.

(10) Patent No.: US 11,249,226 B2
(45) Date of Patent: Feb. 15, 2022

(54) MICRON-SIZE PLASMONIC COLOR SORTER

(71) Applicant: BAR-ILAN UNIVERSITY, Ramat Gan (IL)

(72) Inventors: Adi Salomon, Tel-Aviv (IL); Adam Weissman, Tel Aviv (IL); Elad Segal, Rosh Haayin (IL)

(73) Assignee: BAR-ILAN UNIVERSITY, Ramat Gan (IL)

( * ) Notice: Subject to any disclaimer, the term of this patent is extended or adjusted under 35 U.S.C. 154(b) by 321 days.

(21) Appl. No.: 16/315,199

(22) PCT Filed: Jul. 6, 2017

(86) PCT No.: PCT/IL2017/050756
§ 371 (c)(1),
(2) Date: Jan. 4, 2019

(87) PCT Pub. No.: WO2018/008029
PCT Pub. Date: Jan. 11, 2019

(65) Prior Publication Data
US 2019/0310398 A1      Oct. 10, 2019

Related U.S. Application Data

(60) Provisional application No. 62/359,266, filed on Jul. 7, 2016.

(51) Int. Cl.
*G02B 5/00* (2006.01)
*G02F 1/23* (2006.01)
(Continued)

(52) U.S. Cl.
CPC .............. *G02B 5/008* (2013.01); *G02B 1/002* (2013.01); *G02B 5/3025* (2013.01); *G02F 1/23* (2013.01);
(Continued)

(58) Field of Classification Search
CPC ......... G02B 5/008; G02B 5/3025; G02F 1/23; B82Y 20/00; B82Y 30/00; B82Y 35/00
(Continued)

(56) References Cited

U.S. PATENT DOCUMENTS

| | | | |
|---|---|---|---|
| 4,712,881 A | * | 12/1987 | Shurtz, II ............. G02B 5/3058 359/352 |
| 5,973,316 A | * | 10/1999 | Ebbesen ................ B82Y 35/00 250/216 |

(Continued)

FOREIGN PATENT DOCUMENTS

| | | | |
|---|---|---|---|
| CN | 103777264 A | | 5/2014 |
| JP | 2012159792 | * | 2/2011 |

(Continued)

OTHER PUBLICATIONS

Barnes et al., (2003) Surface plasmon subwavelength optics. Nature 424(6950): 824-830.

(Continued)

*Primary Examiner* — Ricky D Shafer
(74) *Attorney, Agent, or Firm* — J.A. Lindeman & Co. PLLC; Aaron Raphael

(57) ABSTRACT

Provided is an optical device including a dielectric transparent substrate and a metallic layer having a thickness between about 20 nm and about 1000 nm disposed on the transparent substrate. The metallic layer comprises at least one localized group of cavities, each localized group being confined within a diameter smaller than about 5 um, and each localized group comprising at least two cavities, with a distance between two adjacent cavities in the localized group being between about 100 nm and about 2000 nm. Each cavity in the localized group is shaped as a through- (Continued)

hole in the metallic layer, the through hole having a polygonal cross-section having a polygon side length between 50 nm and 2000 nm.

17 Claims, 11 Drawing Sheets

(51) Int. Cl.
*G02B 1/00* (2006.01)
*G02B 5/30* (2006.01)
*B82Y 20/00* (2011.01)
*B82Y 30/00* (2011.01)
*B82Y 35/00* (2011.01)
*G02B 5/20* (2006.01)

(52) U.S. Cl.
CPC .............. *B82Y 20/00* (2013.01); *B82Y 30/00* (2013.01); *B82Y 35/00* (2013.01); *G02B 5/204* (2013.01); *G02F 2203/055* (2013.01); *G02F 2203/10* (2013.01)

(58) Field of Classification Search
USPC .................................................. 359/487.01
See application file for complete search history.

(56) References Cited

U.S. PATENT DOCUMENTS

| | | | |
|---|---|---|---|
| 6,236,033 B1 | 5/2001 | Ebbesen | |
| 6,285,020 B1* | 9/2001 | Kim | G02B 5/204 250/216 |
| 7,560,707 B2* | 7/2009 | Bratkovski | B82Y 20/00 250/458.1 |
| 8,593,595 B2* | 11/2013 | Park | G02F 1/133514 349/106 |
| 8,848,194 B2 | 9/2014 | Walters | |
| 9,256,113 B2 | 2/2016 | Han | |
| 2006/0072114 A1* | 4/2006 | Sigalas | G02B 6/1225 356/445 |
| 2009/0104406 A1* | 4/2009 | Rivero | G02B 5/0816 428/138 |
| 2009/0146081 A1* | 6/2009 | Stark | G02B 5/008 250/492.2 |
| 2010/0118390 A1* | 5/2010 | Blair | G02B 5/008 359/346 |
| 2011/0149214 A1 | 6/2011 | Yoon | |
| 2014/0029104 A1 | 1/2014 | Guo | |
| 2014/0071532 A1 | 3/2014 | Ye | |
| 2014/0268332 A1 | 9/2014 | Guo | |
| 2015/0042702 A1 | 2/2015 | Jiang | |
| 2015/0063748 A1 | 3/2015 | Zhang | |
| 2015/0124306 A1 | 5/2015 | Bartoli | |
| 2015/0285969 A1 | 10/2015 | Kim | |
| 2015/0308893 A1 | 10/2015 | Walters | |
| 2015/0364898 A1* | 12/2015 | Meng | H01S 5/04253 372/40 |
| 2015/0377780 A1 | 12/2015 | Walters | |
| 2016/0010813 A1 | 1/2016 | Rodriguez | |
| 2016/0116795 A1 | 4/2016 | Son | |
| 2016/0146984 A1 | 5/2016 | Jiang | |
| 2017/0338567 A1* | 11/2017 | Puscasu | H01Q 15/0013 |

FOREIGN PATENT DOCUMENTS

| | | |
|---|---|---|
| KR | 20140069879 A | 6/2014 |
| KR | 101447085 B1 | 10/2014 |
| WO | 2015160310 A1 | 10/2015 |

OTHER PUBLICATIONS

Bendikov et al., (2008) Biological sensing and interface design in gold island film based localized plasmon transducers. Anal Chem 80(19): 7487-7498.

Burgos et al., (2013) Color Imaging via Nearest Neighbor Hole Coupling in Plasmonic Color Filters Integrated onto a Complementary Metal-Oxide Semiconductor Image Sensor. ACS Nano 7(11): 10038-10047. With supplementary information.

Cetin et al., (2014) Handheld high-throughput plasmonic biosensor using computational on-chip imaging. Light: Science & Applicationsvolume 3: e122; 10 pages.

Chaturvedi et al., (2009) Imaging of plasmonic modes of silver nanoparticles using high-resolution cathodoluminescence spectroscopy. ACS Nano 3(10): 2965-2974.

Coenen and Polman (2014) Optical properties of single plasmonic holes probed with local electron beam excitation. ACS Nano 8(7): 7350-7358.

Ellenbogen et al., (2012) Chromatic Plasmonic Polarizers for Active Visible Color Filtering and Polarimetry. Nano Lett 12(2): 1026-1031.

Gu et al., (2015) Color generation via subwavelength plasmonic nanostructures. Nanoscale 7: 6409-6419.

Laux et al., (2008) Plasmonic photon sorters for spectral and polarimetric imaging. Nature Photonics 2(3): 161-164.

Law et al., (2007) Wide dynamic range phase-sensitive surface plasmon resonance biosensor based on measuring the modulation harmonics Biosens Bioelectron 23(5): 627-632.

Osorio et al., (2015) Angle-Resolved Cathodoluminescence Imaging Polarimetry. ACS Photonics 3(1): 147-154.

Pérez-López and Merkoçi (2011) Nanomaterials based biosensors for food analysis applications. Trends in Food Science & Technology 22(11): 625-639.

Salomon et al., (2014) Plasmonic coupling between metallic nanocavities. Journal of Optics 16(11): 114012; 7 pages.

Sun et al., (2015) Effect of relative nanohole position on colour purity of ultrathin plasmonic subtractive colour filters. Nanotechnology 26: 305204; 10 pages.

Tan et al., (2014) Plasmonic Color Palettes for Photorealistic Printing with Aluminum Nanostructures. Nano Lett 14(7): 4023-4029. With supplementary information.

Tian et al., (2014) Transmission properties of periodically patterned triangular prisms. Photonics and Nanostructures—Fundamentals and Applications 12(5): 508-514.

Vesseur and Polman (2011) Plasmonic whispering gallery cavities as optical nanoantennas. Nano Lett 11(12): 5524-5530.

Xue et al., (2015) Scalable, full-colour and controllable chromotropic plasmonic printing. Nature Communications 6: 8906; 9 pages.

Willets and Van Duyne (2007) Localized surface plasmon resonance spectroscopy and sensing. Annu Rev Phys Chem 58: 267-297.

Yun et al., (2015) Plasmonic cavity-apertures as dynamic pixels for the simultaneous control of colour and intensity. Nature Communications 6: 7133; 7 pages.

Zeng et al., (2013) Ultrathin nanostructured metals for highly transmissive plasmonic subtractive color filters. Sci Rep 3: 2840; 9 pages.

Zeng et al., (2014) Nanomaterials enhanced surface plasmon resonance for biological and chemical sensing applications. Chem Soc Rev 43(10): 3426-3452.

Zhao et al., (2006) Localized surface plasmon resonance biosensors. Nanomedicine (Lond) 1(2): 219-228.

Salomon et al., (2013) Size and shape resonances in second harmonic generation from silver nanocavities. J Phys Chem C 117(43): 22377-22382.

Zhang et al., (2014) Near-field plasmon effects in extraordinary optical transmission through periodic triangular hole arrays. Optical Engineering 53(10): 107108; 8 pages.

* cited by examiner

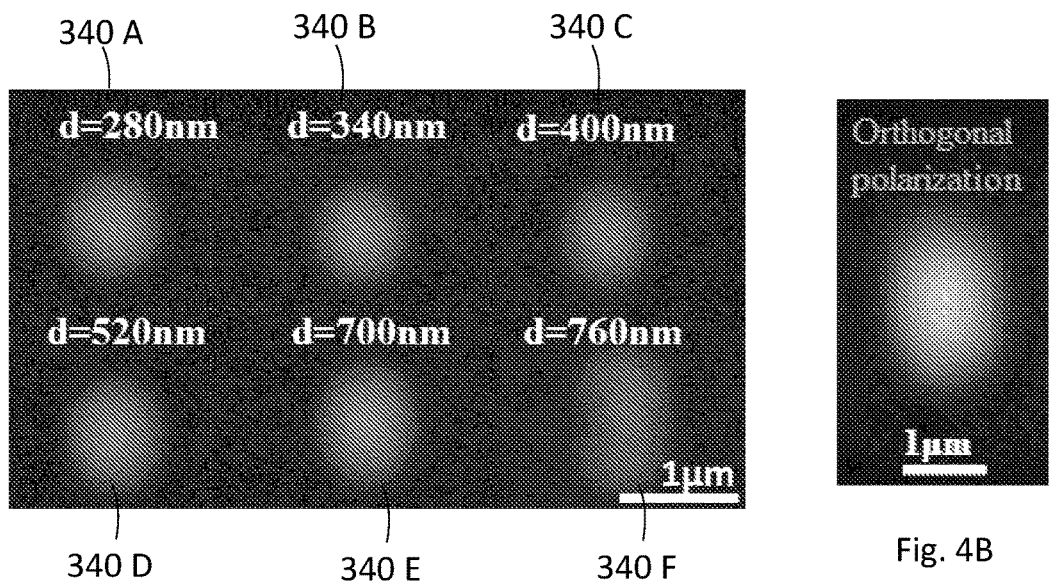
Fig. 4A
Fig. 4B
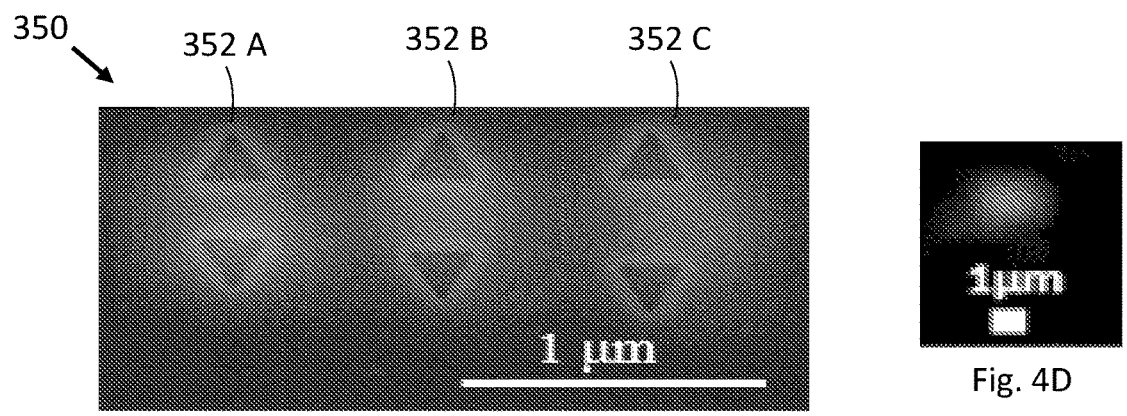
Fig. 4C
Fig. 4D
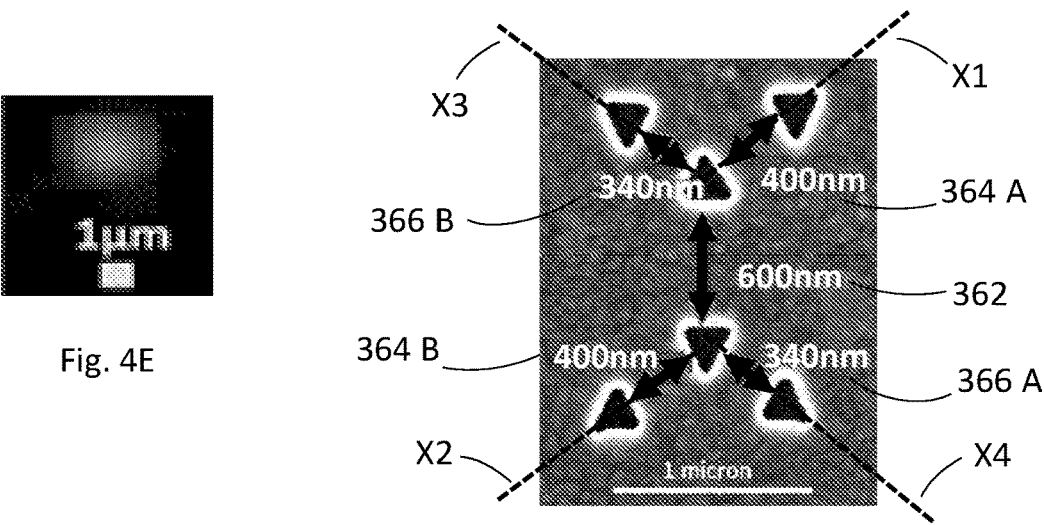
Fig. 4E
Fig. 4F

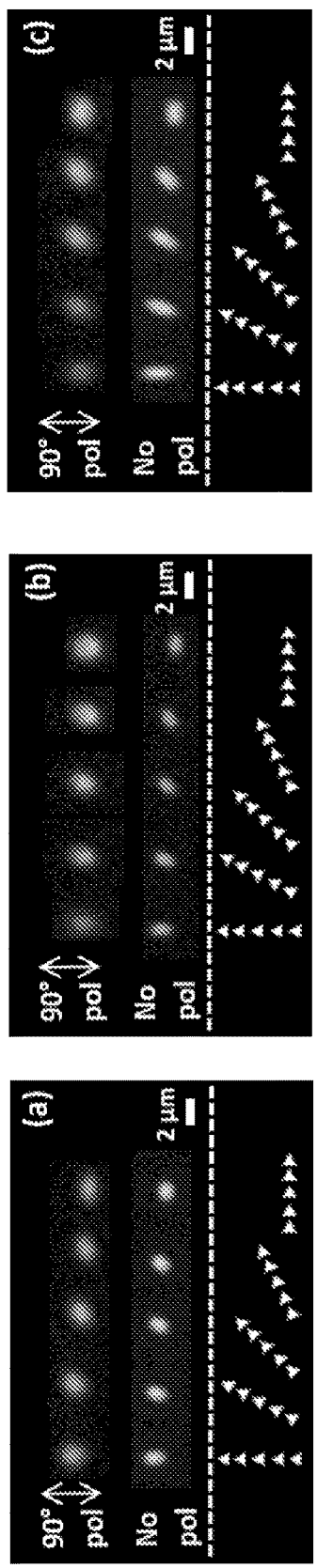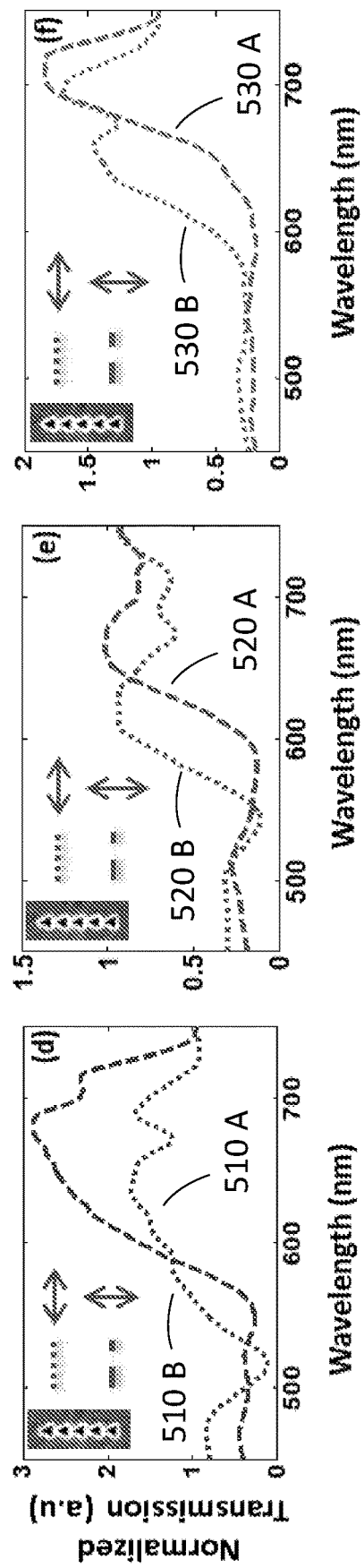
Fig. 6A  Fig. 6B  Fig. 6C
Fig. 6D  Fig. 6E  Fig. 6F

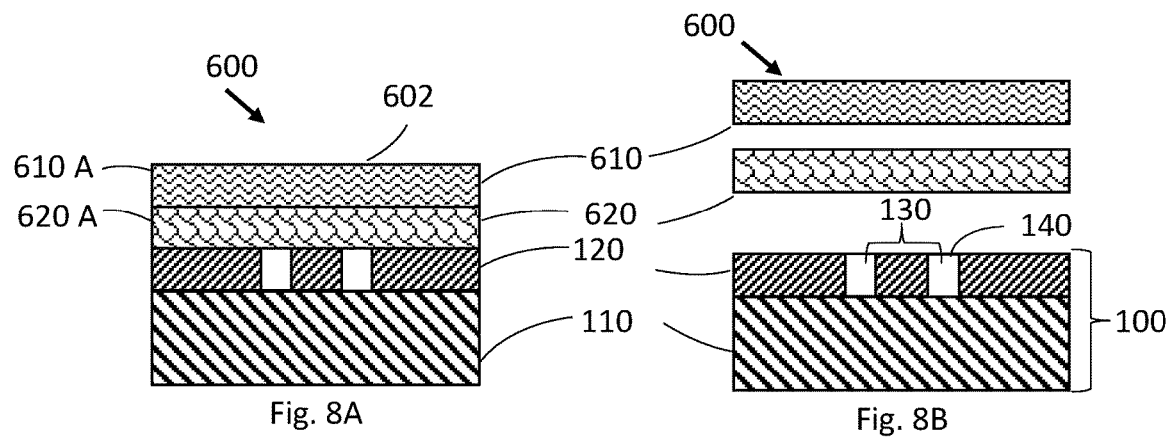
Fig. 8A
Fig. 8B
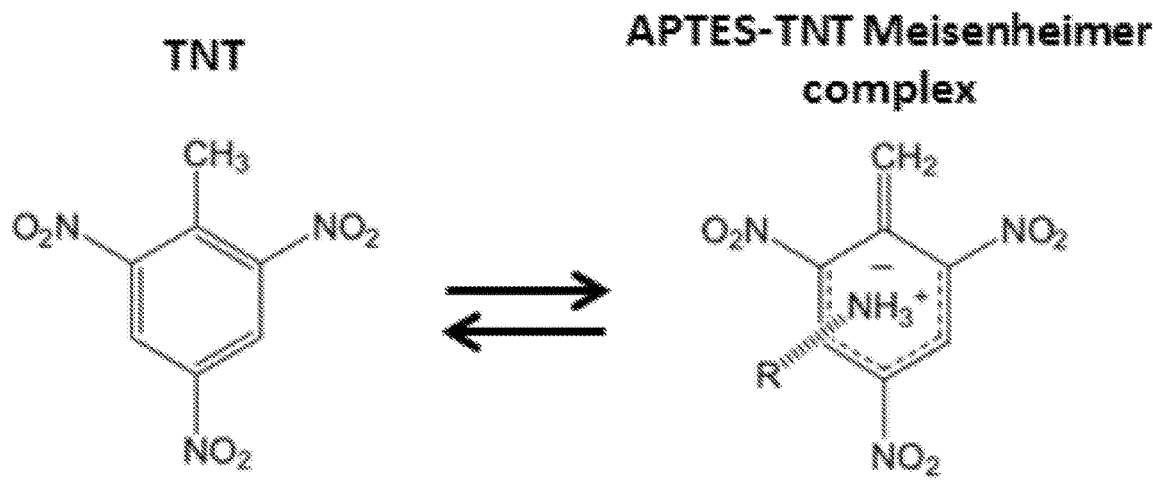
Fig. 8C

100A

100B

700

MICRON-SIZE PLASMONIC COLOR SORTER

FIELD OF THE INVENTION

The invention, in some embodiments, relates to the field of optical devices and more particularly, but not exclusively, to color generation using sub-wavelength structures.

BACKGROUND OF THE INVENTION

Color generation is commonly pigmentation related, and its pixel size is limited to tens of microns, two orders of magnitude larger than the diffraction limit in the visible range. Furthermore, organic dyes undergo degradation under ultraviolet irradiation and over time. Colors can also be generated via interference processes in photonic crystals and in plasmonic sub-wavelength structures. Plasmonic structures have been proposed for the next generation of color displays, because they have the potential to reach diffraction-limit resolution using advanced fabrication techniques. In addition, plasmonic structures can manipulate light efficiently in terms of polarization, intensity and phase, while simultaneously controlling the generated color.

For example, patent application publication number US 2015/0124306 to Bartoli et. al. discloses an ultrathin plasmonic subtractive color filter that includes a transparent substrate and an ultrathin nano-patterned film formed on the substrate. A plurality of elongated parallel nanoslits is formed through the film defining a nanograting. The nanoslits may be spaced apart at a pitch selected to transmit a wavelength of light. The film is formed of a material having a thickness selected, such that when illuminated by incident light, surface plasmon resonances are excited at top and bottom surfaces of the film which interact and couple to form hybrid plasmon modes. The film changes between colored and transparent states when alternatingly illuminated with TM-polarized light or TE-polarized light, respectively. In one configuration, an array of nanogratings may be disposed on the substrate to form a transparent display system.

Plasmonic color generators transmit light over a selective optical range due to the excitation of surface plasmons. The transmitted bands depend on the geometrical parameters of the metallic nanostructures and can be spectrally tuned throughout the entire visible and IR spectrum. Indeed, plasmonic nanostructures such as hole arrays, grooves, disks and slits have been shown to generate colors efficiently, and have the potential to function as dynamic color pixels [Gu, Y.; Zhang, L.; Yang, J. K. W.; Yeo, S. P.; Qiu, C.-W., Nanoscale 2015, 7 (15), 6409-6419; Burgos, S. P.; Yokogawa, S.; Atwater, H. A., ACS Nano 2013, 7 (11), 10038-10047; Sun, L. et al., Nanotechnology 2015, 26 (30), 305204; Laux, E.; et al., Nat. Photonics 2008, 2 (3), 161-164; Ellenbogen, T.; Seo, K.; Crozier, K. B., Nano Lett. 2012, 12 (2), 1026-1031; Tan, S. J.; et al., Nano Lett. 2014, 14 (7), 4023-4029; and Xue, J. et al., Nat. Commun. 2015, 6, 8906]. In particular, metal cavity-apertures can be used to generate the full range of the colour spectrum depending on the polarization state of the incident light, in contrast to the static or discrete colours that are produced by conventional colour pixels. This simultaneous controllability of colour and intensity, which is distinct from the geometry-dependent resonance properties of typical plasmonic structures, is acquired through the combination of two fundamental characteristics of the metal cavity and the nanoaperture in nanophotonics. Yet, the minimal size of such cavity-type plasmonic structures is still limited to several microns. Furthermore, their low transmittance is insufficient for use in displays. It has been suggested to use unconventional nano-aperture forms to enhance the transmission efficiency by inducing a strong charge accumulation at the sharp edges of the aperture [Yun, H.; Lee, S.-Y.; Hong, K.; Yeom, J.; Lee, B., Nat. Commun. 2015, 6 (May), 7133].

Optical devices comprising subwavelength arrayed structures may also be used for optical wavelength conversion. For example, patent application publication number US 2016/0010813 to Rodriguez et. al., discloses an illumination device, comprising a light source such as an LED or a laser diode, a wavelength conversion medium such as a phosphor, and a periodic antenna array made of a highly polarizable material such as a metal. The light source emits primary wavelength light that at least partially is converted in secondary wavelength light by the wavelength conversion medium. The periodic antenna array is positioned in close proximity to the wavelength conversion medium and functions to enhance the efficiency of the absorption and/or emission processes in the wavelength conversion medium through the coupling of the incident primary wavelength light or the emitted secondary light to surface lattice resonances that arise from the diffractive coupling of localized surface plasmon polaritons in the individual antennas of the array.

There remains an unmet need for high intensity and high resolution optical devices based on plasmonic structures, being capable of generating color pixels in micron and submicron range.

SUMMARY OF THE INVENTION

The present invention provides an optical device comprising plasmonic structures. Said plasmonic structures comprise localized groups of nano-cavities, also termed herein "plasmonic units", formed in a thin metallic layer. Said localized groups of cavities can be used to dynamically generate multiple colors, control intensity of the transmitted light, tailor the light field and to monitor its stationary coherence at the nano-scale. Accordingly, the optical device of the present invention can be used as a color generator, a light coherent convertor, an illumination device, a color filter or an optical sensor. The plasmonic units can further be coupled with a molecule-binding material, thereby allowing the detection of various analytes. As such, the optical device of the present invention can also be used as an opto-chemical sensor.

The present invention is based in part on an unexpected finding that a single plasmonic unit comprising cavities having a polygonal cross-section and being as small as about 1 μm long and 200 nm wide is capable of generating multiple colors depending on the polarization state of the incoming optical field. Said plasmonic unit thus provides submicronic color pixels. Without wishing to being bound by theory or mechanism of action, it is contemplated that multiple color generation by a single plasmonic unit is afforded by hybridization between the nano-cavities of the unit. It was surprisingly discovered that while the color of the light transmitted through a single cavity is red, the light transmitted through the coupled localized cavities spans over the whole optical range. Varying the distances between the nano-cavities in the plasmonic unit and/or the dimensions of the cavities can further define the obtainable color spectrum. A single plasmonic unit can also be used to dynamically generate multiple colors by altering the polarization state of incoming light. In addition, controlling the polarization state and/or tuning the distance between the cavities in the plasmonic unit allows enhancement of the transmission efficiency. The optical device according to the principles of the present invention further allows control over the spatial location of the color pixel. Further provided are optical systems, including, inter alia, a dynamic color generator and an opto-chemical sensing system, which incorporate the optical device of the invention.

There is thus provided, according to an aspect of the invention, an optical device comprising a dielectric transparent substrate, and a metallic layer having a thickness between about 20 nm and about 1000 nm disposed on the substrate. The metallic layer comprises at least one localized group of cavities, each localized group being confined within a diameter smaller than about 5 urn, and each localized group comprising at least two cavities, with a distance between two adjacent cavities in the localized group being between about 100 nm and about 2000 nm. Each cavity in the localized group is shaped as a through-hole (cavity) in the metallic layer, the through-hole having a polygonal cross-section having a polygon side length between 50 nm and 2000 nm.

In some embodiments, the metallic layer has a top surface and a bottom surface. In further embodiments, the polygon side lengths of the cavity cross-section on the top surface of the metallic layer are substantially similar to the corresponding polygon side lengths on the bottom side of the metallic layer. In further embodiments, the difference in the corresponding side lengths of the cavity on the top side and on the bottom side is less than about 5%.

According to some embodiments, the dielectric substrate contacts the bottom side of the metallic layer.

According to some embodiments, the optical device further comprises a dielectric transparent layer, disposed above the metallic layer. In certain such embodiments, the dielectric transparent layer contacts the top side of the metallic layer. According to some embodiments, the dielectric transparent layer has a dielectric function of about 1-2 in the optical and in the IR range.

According to some embodiments, the localized group comprises at least two polygonal cavities. According to further embodiments, the localized group comprises at least three polygonal cavities. According to still further embodiments, the localized group comprises at least four polygonal cavities. According to yet further embodiments, the localized group comprises at least five polygonal cavities.

According to some embodiments, the localized group comprises at least two polygonal cavities, arranged to have their bases or side lengths facing a central point in between the cavities, thereby defining a central metallic region there between.

According to some embodiments, the cavity has an isosceles polygon-shaped cross-section. According to some embodiments, the polygonal cross-section is selected from the group consisting of a triangle, a square, and a rectangle. Each possibility represents a separate embodiment of the invention. In some embodiments the polygonal cavity cross-section has triangular symmetry. According to some exemplary embodiments, the polygonal cavity has a triangular cross-section. In some embodiments, the triangle is an isosceles triangle. In certain embodiments, the polygonal cross-section does not include a slit.

According to some embodiments, the localized group comprises at least a first pair of triangular cavities arranged along a first interaction axis and pointing to opposite directions from one another thereby having their bases facing each other and defining the central metallic region there between. According to some embodiments, the localized group further comprises a second pair of triangular cavities, pointing to opposite directions from one another and arranged along a second interaction axis, perpendicular to the first interaction axis.

According to some embodiments, the localized group of cavities comprises a first subgroup of triangular cavities arranged along a first interaction axis, wherein the cavities are grouped into two arrays, pointing to opposite directions from one another. The triangles in each array are pointing to the same direction, such that two adjacent triangles from the opposing arrays have their bases facing each other and defining the central metallic region there between. According to some embodiments, the localized group further comprises a second subgroup of triangular cavities arranged along a second interaction axis, perpendicular to the first interaction axis. In further embodiments, the cavities in the second subgroup are grouped into two arrays, pointing to opposite directions from one another, wherein the triangles in each array are pointing to the same direction, such that two adjacent triangles from the opposing arrays have their bases facing each other and defining the central metallic region there between. Said first subgroup and said second subgroup can include between 4 and 10 triangular cavities.

According to some embodiments, the localized group comprises between 3 and 7 triangular cavities aligned along a straight line, all triangles pointing to a same direction. In further embodiments, the localized group comprises between 4 and 6 triangular cavities. In some exemplary embodiments, the localized group comprises 5 triangular cavities.

According to some embodiments, the localized group comprises a combination of the first subgroup and the second subgroup of triangular cavities, as described hereinabove, and at least one subgroup of between 3 and 7 triangular cavities aligned along a straight line, wherein all triangles are pointing to a same direction.

According to some embodiments, the diameter of the localized group of cavities is smaller than about 4 µm. According to further embodiments, the diameter of the localized group is smaller than about 3 µm. According to still further embodiments, the diameter of the localized group is smaller than about 2 µm. In some exemplary embodiments, the diameter of the localized group is about 1 µm.

According to some embodiments, the distance between two adjacent cavities in the localized group ranges between about 100 nm and about 1500 nm. According to further embodiments, the distance between two adjacent cavities in the localized group ranges between about 100 nm and about 1250 nm. According to still further embodiments, the distance between two adjacent cavities in the localized group ranges between about 100 nm and about 1000 nm. According to yet further embodiments, the distance between two adjacent cavities in the localized group ranges between about 100 nm and about 800 nm. According to still further embodiments, the distance between two adjacent cavities in the localized group ranges between about 100 nm and about 600 nm. According to yet further embodiments, the distance between two adjacent cavities in the localized group ranges between about 100 nm and about 400 nm. According to still further embodiments, the distance between two adjacent cavities in the localized group ranges between about 100 nm and about 300 nm.

According to some embodiments, the cavity has a polygon side length between about 50 nm and about 800 nm. According to further embodiments, the polygon side length ranges between about 100 nm and about 600 nm. According to still further embodiments, the polygon side length ranges between about 100 nm and about 400 nm. In certain embodiments, the polygon side length ranges between about 100 nm and about 300 nm.

According to some embodiments, the metallic layer disposed on the substrate has a thickness between about 20 nm and about 800 nm. According to further embodiments, the thickness of the metallic layers ranges from about 50 nm to about 600 nm. According to further embodiments, the thickness of the metallic layers ranges from about 100 nm to about 400 nm. In certain embodiments, the metallic layer is not transparent to the visible light.

According to some embodiments, the metallic layer comprises a metal selected from Ag, Al, Au and Cu. Each possibility represents a separate embodiment of the invention.

In some embodiments, the cavities in the at least one localized group of cavities generate a joint electromagnetic radiation. The wavelength of the generated electromagnetic radiation can range from about 200 nm to about 2000 nm. In some embodiments, the wavelength ranges from about 200 nm to about 1500 nm. In further embodiments, the wavelength ranges from about 300 nm to about 1000 nm. In still further embodiments, the wavelength ranges from about 400 nm to about 700 nm.

In certain embodiments, the at least one localized group of cavities generates one color pixel. In further embodiments, the color pixel has a diameter, which corresponds to the diameter of said at least one localized group. In further embodiments, the distance between two adjacent cavities and/or the polygon side length of the cavity defines the wavelength of the color pixel. In additional embodiments, the distance between two adjacent cavities and/or the polygon side length of the cavity defines the intensity of the color pixel. Each possibility represents a separate embodiment of the invention.

In some currently preferred embodiments, the electromagnetic radiation generated by the at least one localized group of cavities is substantially monochromatic. In certain embodiments, the electromagnetic radiation has a spectral width (full width at half maximum (FWHM)) of less than about 150 nm. In some embodiments, the electromagnetic radiation generated by the at least one localized group of cavities has a spectral width of less than about 100 nm. In further embodiments, the electromagnetic radiation generated by the at least one localized group of cavities has a spectral width of less than about 75 nm. In other embodiments, the electromagnetic radiation is polychromatic, having spatially resolved color regions within the pixel.

The pixel size of the color pixels generated by the optical device of the invention can range from about 0.7 µm to about 5 µm. In further embodiments, the pixel size ranges from about 1 µm to about 3 µm. In certain embodiments, the pixel size ranges from about 1 µm to about 2 µm.

The color pixel can comprise simultaneously one or more colors. In some embodiments, the pixel size is between about 0.7 µm and 1.5 µm. In further embodiments, the color pixel comprises one color. In still further embodiments, the diameter of the localized group of cavities is between about 700 nm and 1 µm.

In some embodiments, the pixel size is between about 1 µm and 2 µm. In further embodiments, the color pixel comprises two colors. In still further embodiments, the diameter of the localized group of cavities is between about 700 nm and 1.5 µm.

In some embodiments, the pixel size is between about 1.5 µm and 3 µm. In further embodiments, the color pixel comprises three colors. In still further embodiments, the diameter of the localized group of cavities is between about 1.25 µm and 2.5 µm.

According to some embodiments, the at least one localized group comprises a plurality of localized groups arranged in an array, wherein the distance between two adjacent cavities in the localized group is smaller than a distance between two different localized groups. In certain embodiments, the distance between two adjacent cavities in the localized group is smaller than the distance between two different localized groups by at least about 20%. In further embodiments, the distance between two adjacent cavities in the localized group is smaller than the distance between two different localized groups by at least about 30%, at least about 40%, or at least about 50%. Each possibility represents a separate embodiment of the invention. The plurality of localized groups can include as much as 100-500 localized groups or more. In some embodiments, the plurality of localized groups includes 4-20 localized groups, 10-50 localized groups, 50-100 localized groups, or 100-500 localized groups of cavities.

In some embodiments, the localized groups are identical to each other. In other embodiments, the localized groups of cavities are different. The localized groups of cavities can have different diameters, distances between two adjacent cavities in the localized group, and/or polygon side lengths of the cavities. Each possibility represents a separate embodiment of the invention. In certain embodiments, the plurality of localized groups of cavities have different distances between two adjacent cavities in the localized group.

The dielectric transparent substrate can be rigid or flexible. The dielectric transparent substrate can be made of a material selected from glass, quartz, aluminum oxynitride, and polymers, including, inter alia, polycarbonate, and poly(methyl methacrylate). Each possibility represents a separate embodiment of the invention. The thickness of the substrate can range from about 0.01 mm to about 1 mm.

The dielectric transparent layer can be rigid or flexible. The dielectric transparent layer can be made of a polymer, including, but not limited to, polyvinyl alcohol (PVA), polyethylene (PE), cellulose acetate, and derivatives thereof. Each possibility represents a separate embodiment of the invention. The thickness of the dielectric transparent layer can range from about 10 nm to about 1000 nm. In some embodiments, the thickness of the dielectric transparent layer ranges from about 100 nm to about 400 nm.

In some embodiments, the optical device comprises a transparent sensor layer. In some embodiments, the sensor layer is configured to bind analyte molecules. The binding of analyte molecules can include at least one of adsorbing, absorbing, electrostatically adhering to, and coordinating with the analyte molecules. In some embodiments, the sensor layer is disposed on top of the metallic layer. In further embodiments, the sensor layer is disposed on top of the transparent dielectric layer. The sensor layer can include a base layer chemically modified with molecules, which bind the desired analyte molecules. The non-limiting examples of said molecules include amino-propyl-tri-ethoxy-silane (APTES) and triethoxy(octyl)silane (OTES). In some embodiments, said molecules form a monolayer on the base layer. In certain embodiments, the sensor layer comprises a $SiO_2$ base layer modified by an APTES monolayer or an OTES monolayer. Each possibility represents a separate embodiment of the invention. The modified surface is also termed herein "sensing surface".

In some embodiments, the optical device is configured to be coupled to a source of electromagnetic radiation. In some embodiments, the optical device is configured to be coupled to a polarizer.

According to some embodiments, the optical device is configured for use as a dynamic color generator, dynamic color sorter, opto-chemical sensor, a light coherent convertor, or an illumination device. Each possibility represents a separate embodiment of the invention.

In another aspect there is provided a system comprising the optical device according to the various embodiments of the invention, and a polarizer. In some embodiments, the system further comprises a source of electromagnetic radiation. In some embodiments, the polarizer is configured to define the wavelength of the color pixel generated by the optical device. In additional embodiments, the polarizer is configured to define the intensity of the color pixel. Defining the intensity of the pixel can include generating and/or switching off the color pixel.

The source of electromagnetic radiation can have a wavelength ranging from about 200 nm to about 2000 nm. In some embodiments, the wavelength ranges from about 200 nm to about 1500 nm. In further embodiments, the wavelength ranges from about 300 nm to about 1000 nm. In still further embodiments, the wavelength ranges from about 400 nm to about 700 nm. In some embodiments, the wavelength of electromagnetic radiation is in the visible spectrum range. In further embodiments, said source is a visible light source. The electromagnetic radiation source can be any black body radiation source, such as, but not limited to, a xenon lamp, halogen lamp, Incandescent lamp, fluorescent lamp, laser, or LED. In some currently preferred embodiments, the light source has a spectral width (FWHM) of at least about 400 nm. In further embodiments, the light source has a spectral width covering at least one of the UV, visible and IR spectra. In certain embodiments, the light source does not include a laser.

In certain embodiments, said polarizer is a linear polarizer.

In additional embodiments, the system further comprises at least one component selected from a microscope, spectrograph, spectrometer, monochromator, filter, and camera. The microscope can include, inter alia, an optical microscope, an electron microscope or a cathodoluminescence (CL) microscope. The microscope can have any suitable numerical aperture, as known in the art. In order to display high-resolution images of the generated color pixels, the microscope should preferably have a numerical aperture of at least about 0.5. The spectrometer can be, for example, a Raman spectrometer or a IR spectrometer. In some embodiments, the filter is selected from a notch filter, edge pass filter, a band pass filter, and combinations thereof. Each possibility represents a separate embodiment of the invention.

The system can include a plurality of the optical devices of the invention, including the devices comprising different polygonal cross-sections and/or orientation of the cavities. The optical device can include a plurality of localized groups of cavities. In some embodiments, the localized groups are identical to each other. In some embodiments, the localized groups of cavities have different diameters, distances between two adjacent cavities in the localized group, and/or polygon side lengths of the cavities.

According to some embodiments, the system is configured for use as a dynamic color generator, dynamic color sorter, opto-chemical sensor, a light coherent convertor, or an illumination device. Each possibility represents a separate embodiment of the invention.

In another aspect, there is provided a dynamic color generator, comprising the optical device comprising a plurality of localized groups of cavities, according to the various embodiments of the invention, a source of electromagnetic radiation and a polarizer.

The source of electromagnetic radiation and the polarizer can be selected as described in various embodiments hereinabove. In certain embodiments, the electromagnetic radiation source is selected to provide radiation in the visible spectral range.

The localized groups of cavities can have different diameters, distances between two adjacent cavities in the localized group, and/or polygon side lengths of the cavities. In certain embodiments, at least one of the above-mentioned parameters differs between each two localized groups of cavities.

In some embodiments, the cavity has a triangular cross-section. In certain embodiments, the localized group of cavities comprises a first pair of triangular cavities arranged along a first interaction axis and a second pair of triangular cavities, arranged along a second interaction axis, perpendicular to the first interaction axis. In some embodiments, the localized groups of cavities have a diameter of less than about 2 μm. In further embodiments, the localized groups of cavities have a diameter of about 1 μm. In certain embodiments, at least a portion of the localized groups of cavities have different distances between two adjacent cavities in the localized group.

In yet another aspect there is provided a sensing system, comprising the optical device comprising a plurality of localized groups of cavities; according to the various embodiments of the invention, a polarizer; and an optical pattern recognition analyzer. In some embodiments, the optical device comprises a sensor layer. The optical device comprising at least one localized group of cavities and a sensor layer is also termed herein an "opto-chemical sensor".

The localized groups of cavities can have different diameters, distances between two adjacent cavities in the localized group, and/or polygon side lengths of the cavities. In certain embodiments, at least one of the above-mentioned parameters differs between each two localized groups of cavities.

In some embodiments, the cavity has a triangular cross-section. According to some embodiments, the localized group of cavities comprises between 3 and 7 triangular cavities aligned along a straight line, all triangles pointing to a same direction. In certain embodiments, at least a portion of the localized groups of cavities have different distances between two adjacent cavities in the localized group.

In some embodiments, the optical pattern recognition analyzer is configured to detect, display, measure, and/or analyze the electromagnetic radiation generated by the plurality of the localized groups of cavities. Each possibility represents a separate embodiment of the invention. The optical pattern recognition analyzer can include at least one of a microscope, a spectrophotometer, a spectrograph, and a camera. In some embodiments, the optical pattern recognition analyzer comprises an optical microscope. In some embodiments, the optical pattern recognition analyzer comprises a Raman spectrophotometer or an IR spectrophotometer. Each possibility represents a separate embodiment of the invention.

In some embodiments, the optical pattern recognition analyzer further comprises a processing unit, which compares electromagnetic radiation generated by the localized groups of cavities to stored data. In some embodiments, said electromagnetic radiation has a wavelength in a visual spectrum range. In certain such embodiments, said electromagnetic radiation comprises color pixels. In some embodiments, the processing unit compares at least one parameter of the generated electromagnetic radiation selected from a wavelength and intensity. In some embodiments, the processing unit is configured for performing various algorithms selected from discriminant function analysis (DFA), artificial neural network algorithms, principal component analysis (PCA), multi-layer perception (MLP), generalized regression neural network (GRNN), fuzzy inference systems (FIS), self-organizing map (SOM), radial bias function (RBF), genetic algorithms (GAS), neuro-fuzzy systems (NFS), adaptive resonance theory (ART), partial least squares (PLS), multiple linear regression (MLR), principal component regression (PCR), linear discriminant analysis (LDA), cluster analysis, and nearest neighbor.

In further embodiments, the processing unit selects a closest match between the electromagnetic radiation generated by the localized groups of cavities and a spectra set from the stored data. In some embodiments, the stored data includes a plurality of spectra sets of electromagnetic radiation generated by the localized groups of cavities upon exposure of the optical device to known analytes, wherein each spectra set corresponds to each particular analyte. The stored data can further include electromagnetic spectra generated by the localized groups of cavities in the absence of analytes. In some embodiments, the stored data includes spectra sets of electromagnetic radiation generated by the localized groups of cavities upon exposure of the optical device to known analytes under various polarization states of incoming electromagnetic radiation.

In some embodiments, the sensing system further comprises a source of electromagnetic radiation. The wavelength of the source of electromagnetic radiation can range from about 200 nm to about 2 µm. In some embodiments, the wavelength of electromagnetic radiation is in the visible spectrum range. In some embodiments, the wavelength of electromagnetic radiation is in the IR spectrum range. In further embodiments, said source is a visible light source. The electromagnetic radiation source can be any black body radiation source, such as, but not limited to, a xenon lamp, halogen lamp, Incandescent lamp, fluorescent lamp, laser, and LED.

The sensing system according to the principles of the present invention can be used in gaseous or liquid media.

In still another aspect there is provided a method of detecting an analyte, comprising the steps of: (a) providing the sensing system according to the various embodiments of the present invention; (b) exposing the optical device to a test sample; (c) detecting the electromagnetic radiation generated by the localized groups using the optical pattern analyzer; (d) comparing the electromagnetic radiation using the optical pattern analyzer to the stored data. In some embodiments, the method further comprises selecting the closest match between the electromagnetic radiation generated by the localized groups and a spectra set from the stored data.

The analyte can be selected from a herbicide, pesticide, explosive, volatile organic compound, and disease biomarker. In certain embodiments, the analyte is selected from trinitrotoluene (TNT); 1,3,5-trinitrobenzene (1,3,5-TNB); 1,3-dinitrobenzene (1,3-DNB), and alachlor (2-Chloro-N-(2,6-diethylphenyl)-N-(methoxymethyl)acetamide)). The test sample can comprise a gaseous or a liquid medium. The sensing system of the present invention can beneficially be used to detect analyte concentrations of as low as about 10 ppb and even less.

In some embodiments, the step of exposing the optical device to a test sample comprises exposing the sensor layer of the optical device to a test sample.

In some embodiments, the method of detecting an analyte comprises a step of exposing the optical device to a source of electromagnetic radiation. The sensor can be exposed to said radiation source during the steps of exposing the optical device to a test sample and measuring the electromagnetic radiation generated by the localized groups. In some embodiments, the method comprises a step of changing the polarization state of the electromagnetic radiation. The polarization state can be changed following the step of comparing the electromagnetic radiation to the stored data. In further embodiments, steps (b) and (c) are repeated with the different polarization state of the incoming electromagnetic radiation.

According to some embodiments there is provided a dynamic plasmonic color sorter of about one micrometer long and 200 nm wide. The color sorter is able to generate multiple colors on the same structure depending on the polarization state of incoming optical field. Color sorting is based on hybridization between nano-cavities, as is further explained below. In some embodiments, the dynamic plasmonic color sorter comprises the optical device according to the various embodiments of the invention.

The following detailed description should be read with reference to the drawings in which similar elements in different drawings are numbered the same. The detailed description and the drawings, which are not necessarily to scale, depict illustrative embodiments and are not intended to limit the scope of the invention. The depicted embodiments are intended only as exemplary. Selected features of any illustrative embodiment may be incorporated into other embodiment unless clearly stated to the contrary.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures:

FIG. 4A schematically shows black-and-white representations of six optical transmission color micrographs taken for six optical devices, respectively, with the dimer of FIG. 2A, having six different distances, respectively, between the triangular cavities;

FIG. 4B schematically shows a representative transmission micrograph of the dimeric optical device under white light in a linear polarization orthogonal to the cavities interaction axis;

FIG. 4C schematically shows a transmission micrograph of an embodiment of a micro RGB pixel 350 displayed over its SEM image, the micro RGB pixel comprising three dimers having three different distances respectively, between the triangular cavities;

FIG. 4D shows a low magnification transmission micrograph of the micro RGB pixel of FIG. 4C illuminated by white light, polarized parallel to the interaction axis Y of the dimers, and obtaining a green spot;

FIG. 4E shows a low magnification transmission micrograph of the micro RGB pixel of FIG. 4C illuminated by white light, polarized perpendicular to the interaction axis Y of the dimers, and obtaining a red spot;

FIG. 4F schematically depicts an SEM image of another embodiment of a micro-RGB pixel, comprising six isosceles triangular cavities arranged in a dagger like configuration;

FIG. 6A schematically shows a black-and-white representation of color transmission micrographs of the optical device FIG. 5A having a pentamer with a distances of 130 nm between cavities;

FIG. 6B schematically shows a black-and-white representation of color transmission micrographs of the optical device of FIG. 5A having a pentamer with a distances of 180 nm between cavities;

FIG. 6C schematically shows a black-and-white representation of color transmission micrographs of the optical device FIG. 5A having a pentamer with a distances of 230 nm between cavities;

FIG. 6D schematically depicts measurement results of transmission spectra for the optical device of FIG. 6A;

FIG. 6E schematically depicts measurement results of transmission spectra for the optical device of FIG. 6B;

FIG. 6F schematically depicts measurement results of transmission spectra for the optical device of FIG. 6C;

FIG. 8A depicts schematically in a cross-sectional side view an opto-chemical sensor comprising an embodiment of the optical device of the invention;

FIG. 8B schematically depicts the opto-chemical sensor of FIG. 8A in a partially-exploded cross-sectional side view;

FIG. 8C schematically depicts a TNT-APTES Meisenheimer complex;

DETAILED DESCRIPTION

Figure 1:
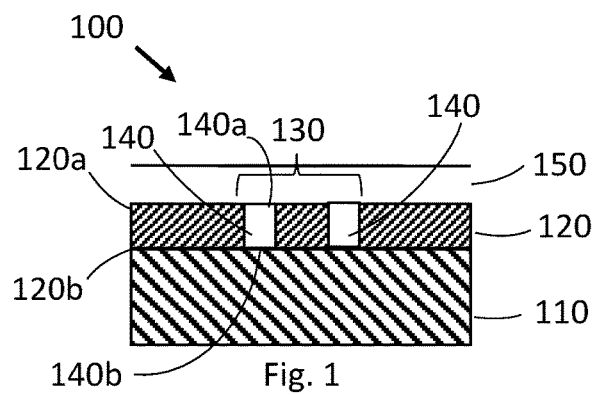
FIG. 1 schematically depicts an embodiment of an optical device in a cross-sectional side view, according to an aspect of the invention.

The principles, uses and implementations of the teachings herein may be better understood with reference to the accompanying description and figures. Upon perusal of the description and figures present herein, one skilled in the art is able to implement the teachings herein without undue effort or experimentation. In the figures, like reference numerals refer to like parts throughout.

The present invention provides an optical device comprising plasmonic structures comprising localized groups of nano-cavities formed in a thin metallic layer. Instead of using unconventional nanoaperture forms, the present invention employs an aggregation of simple polygon-shaped cavities, having a substantially uniform thickness throughout the metallic layer. It was surprisingly discovered by the inventors of the present invention that the light transmitted through the coupled localized cavities having a triangular cross-section spans over the whole optical range, wherein its wavelength and intensity can be tuned by the structural features of the localized group of cavities and/or by the polarization of the incoming optical field. Triangular cavities carved in a metallic film were previously used to explore coupling between plasmonic modes thereof by measuring the second harmonic generation (SHG) response at different polarizations of the input beam [A. Salomon, Y. Prior, M. Fedoruk, J. Feldmann, R. Kolkowski and J. Zyss; Plasmonic coupling between metallic nanocavities, Journal of Optics, 16 (11) 2014]. The inventors of the present invention have unexpectedly found that such simple plasmonic structures can be used to generate submicron color pixels, which can be implemented in optical devices having extremely high and controllable signal resolution and intensity.

FIG. 1 schematically depicts an embodiment of an optical device 100 in a cross-sectional side view, according to an aspect of the invention. Optical device 100 comprises a dielectric substrate 110 and a metallic layer 120 disposed on the dielectric substrate. Dielectric substrate 110 is transparent. The term "transparent", as used herein, is to be understood as transparent in the intended optical range. For example, in an embodiment intended to be used in the visible range, dielectric substrate 110 is transparent for light waves with wavelengths in the range between about 400 nm and 800 nm, or on at least in a portion of this range. For such intended use in the optical range, dielectric substrate 110 may be accordingly made of $SiO_2$ glass. Dielectric substrate 110 is thick enough to maintain mechanical integrity of the optical device 100. For example, dielectric substrate 110 may have a thickness of about 0.1 mm or greater, yet for embodiments implemented on very small surfaces (e.g. having a surface area smaller than about 0.5 square centimeter) thinner substrates are contemplated.

Metallic layer 120 is substantially opaque in the intended optical range. Accordingly, for an intended use in the visible range, metallic layer 120 may be made for example of Ag, Al, Au or Cu and have a thickness greater than 20 nm. Preferably, metallic layer 120 thickness is in a range between about $\frac{1}{10}$ of the wavelength intended to be used, to about twice the wavelength intended to be used. For example, in an embodiment of optical device 100 intended to be used in the visible range, metallic layer 120 may be between 40 nm and 1500 nm thick, more preferably between about 100 nm and about 1000 nm thick. In additional embodiments, metallic layer 120 has a thickness ranging from about 20 nm to about 800 nm, from about 50 nm to about 600 nm, or from about 100 nm to about 400 nm.

Metallic layer 120 comprises a localized group 130 of cavities 140 formed as through-holes through the metallic layer. For example, FIG. 1 depicts 2 cavities 140 of localized group 130 positioned along the cross-section of the Figure. Each cavity is shaped to have a polygonal cross-section in top view, as is further detailed and explained below. Localized group 130 is localized in the sense that (A) a distance between two adjacent cavities in the group is smaller than a distance between two cavities in different localized groups (that is, in embodiments wherein optical device 100 comprises more than one localized group of cavities); and (B) that all the cavities in the localized group are positioned within an area confined by a pre-determined diameter, for example smaller than about 5 um. It is noted however that the overall dimension of a localized group may depend, as other dimensions of the optical device detailed above, on the intended wavelength, and may generally be expressed as about 5 or 6 times the wavelength intended to be generated by the optical device. Thus an overall size of a localized group of cavities for use in the visible range is smaller than about 5 um as indicated above. The term "adjacent", as used herein, is to be construed as "near but not touching", The term "distance between two adjacent cavities", as used herein, refers to the shortest distance between two nearest points of the two adjacent cavities. The term "diameter", as used herein, refers in some embodiments to the distance between peripheral points of two most distantly spaced cavities in the localized group.

Metallic layer 120 has top side 120a and bottom side 120b. In some embodiments, cavity 140 has an isosceles polygonal cross-section in top view. In some embodiments, cavity 140 has substantially similar polygon side lengths on the top side 140a and on the bottom side 140b of the metallic layer. The term "substantially similar", as used herein, refers in some embodiments to the difference in the corresponding side lengths of the cavity on the top side and on the bottom side of less than about 5%. In some embodiments, the ratio between the surface of the cavity on the top side of the metallic film and on the bottom side of the metallic film is about 1:1.

Cavities 140 in localized group 130 are configured to generate a joint electromagnetic radiation spectrum when irradiated by incoming electromagnetic field. The generated electromagnetic radiation can be in the UV-VIS-IR range. Accordingly, localized group 140 can generate a color pixel. The color pixel has a diameter, which corresponds to the diameter of localized group 140. The term "corresponds", as used herein refers in some embodiments to the difference between the diameter of the color pixel and the diameter of the localized group of less than about 30%. In further embodiments, the term "corresponds" refers to the difference between the diameter of the color pixel and the diameter of the localized group of less than about 20%. In additional embodiments, said term corresponds to the difference between the diameter of the color pixel and the diameter of the localized group of less than about 10%. It should be noted that said percentage values refer to color pixels, which are displayed by an imaging device with numerical aperture of 0.5 or higher.

In some embodiments, the electromagnetic radiation generated by cavities 140 in localized group 130 is substantially monochromatic. The term "substantially monochromatic", as used herein, refers to a distinct spectral peak (e.g. distinct color). In some embodiments, said generated electromagnetic radiation has a spectral width (full width at half maximum (FWHM)) of less than about 100 nm.

According to some embodiments, optical device 100 may optionally further comprise a dielectric layer 150 disposed on metallic layer 140. Dielectric layer 150 is configured to be transparent in the intended wavelengths, and preferably having a refractive index similar to the refractive index of the dielectric substrate 110. In embodiments where dielectric substrate 110 is made of SiO₂ glass, dielectric layer 150 may be made for example of a polymer, for example transparent polyvinyl alcohol (PVA) or Silica (SiO₂), having a refractive index equal to about 1.5. Dielectric layer 150 is further configured to protect the metallic layer 140 from mechanical damage and/or chemical transformations, e.g. corrosion or oxidation in air. According to some embodiments, dielectric layer 150 may have a thickness between about 10 nm and about 1000 nm, preferably between about 100 nm and about 400 nm.

Figure 2A:
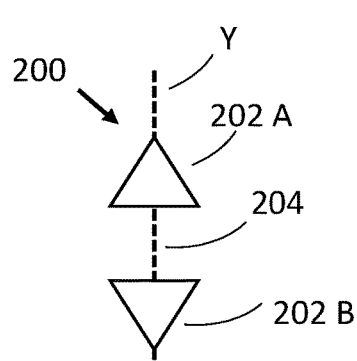
FIG. 2A schematically depicts a localized group of a pair of cavities of an embodiment of the optical device of FIG. 1, arranged along a first interaction axis and forming a dimer.

FIGS. 2A-2D depict in top view four examples of localized groups of cavities, demonstrating the polygonal shape of the cavities. FIG. 2A depicts a localized group (dimer) 200 comprising a pair of cavities 202A and 202B, respectively. Each cavity is shaped to have a cross-section of an isosceles triangle. The cavities are arranged along an axis of interaction Y, the triangles pointing in opposite directions from one another, so that their bases face each other, defining a central metallic region 204 in between. A length L of a triangle side may be roughly ¹⁄₁₀ to twice the intended wavelength. For example, for embodiments intended to be used with light waves in the visible range, the length L of a triangle side may be in a range between 50 nm and 2000 nm, more preferably between about 100 nm and about 1000 nm and even more preferably between about 200 nm and 600 nm. In additional embodiments, the length L of a triangle side is in the range between 50 nm and about 800 nm, between about 100 nm and about 600 nm, between about 100 nm and about 400 nm or between about 100 nm and about 300 nm. A distance D between the triangles is the shortest distance between two nearest points of the two adjacent cavities, which in this embodiment are the bases of the triangles. The distance D may be in a range between about ¼ the intended wavelength to about twice the intended wavelength. For example, for embodiments intended to be used with light waves in the visible range, the distance D may be in a range between 100 nm and 2000 nm, and more preferably between 200 nm and 1000 nm. In additional embodiments, the distance D ranges between about 100 nm and about 1500 nm, between about 100 nm and about 1250 nm, between about 100 nm and about 1000 nm, between about 100 nm and about 800 nm, between about 100 nm and about 600 nm, between about 100 nm and about 400 nm, or between about 100 nm and about 300 nm.

Figure 2B:
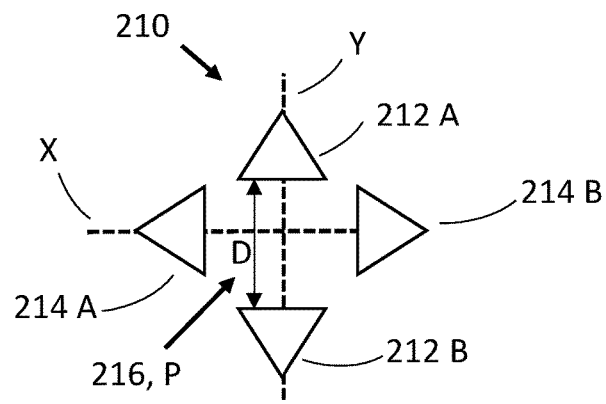
FIG. 2B schematically depicts a localized group of cavities of an embodiment of the optical device of FIG. 1, comprising a first pair arranged along a first interaction axis and a second pair arranged along a second interaction axis, forming a tetramer.

FIG. 2B depicts a localized group (tetramer) 210 comprising a first pair of cavities 212A and 212B, respectively, and a second pair of cavities 214A and 214B, respectively, arranged symmetrically around a central point P. Each cavity is shaped to have a cross-section of an isosceles triangle. The cavities 212 of the first pair are arranged along an axis of interaction Y to form a dimer such as dimer 200, the triangles 212A and 212B pointing in opposite directions from one another so that their bases face each other. The cavities 214 of the second pair are arranged along an axis of interaction X, X being perpendicular to Y, to form a second dimer such as dimer 200, the triangles 214A and 214B pointing in opposite directions from one another so that their bases face each other. The bases of the triangular cavities are thus defining a central metallic region 216 there between, around P. The length L of the triangle side may be generally similar to the length L in the dimer 200 of FIG. 2A. The distance D between two opposite triangles may be generally similar to the distance D in the dimer 200 of FIG. 2A. For example, for embodiments intended to be used with light waves in the visible range, the distance D may be in a range between 100 nm and 1500 nm, and more preferably between 200 nm and 1000 nm.

Figure 2C:
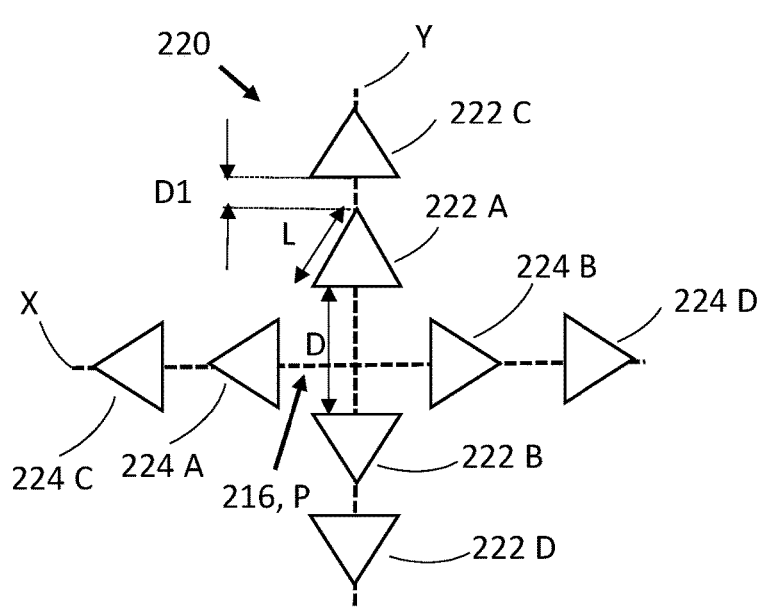
FIG. 2C schematically depicts a localized group of cavities of an embodiment of the optical device of FIG. 1, comprising the tetramer of FIG. 2B and further comprising four additional cavities arranged symmetrically along the first and second interaction axes, thereby forming an octamer.

FIG. 2C depicts a localized group (octamer) 220 comprising eight cavities. Four cavities 222A, 222B, 224A and 224B are arranged as in local group 210 described above. Two additional cavities, namely 222C and 222D are disposed along interaction axis Y near cavities 222A and 222B, respectively, pointing to opposite directions from one another. Two cavities, namely 224C and 224D are disposed along interaction axis X near cavities 224A and 224B, respectively pointing to opposite directions from one another. The length L and the distance D in octamer 220 may be generally similar to their equivalents length L and distance D in the embodiments of FIGS. 2A and 2B. A distance D1 between two adjacent cavities (pointing to the same direction) along one of the interaction axes may be in the same range of the distance D. For visible light applications, D1 may be in the range between 100 nm and 1500 nm, and more preferably between 200 nm and 1000 nm. Generally, D1 may be similar to D or alternatively different from D, namely smaller than D or larger than D.

Figure 2D:
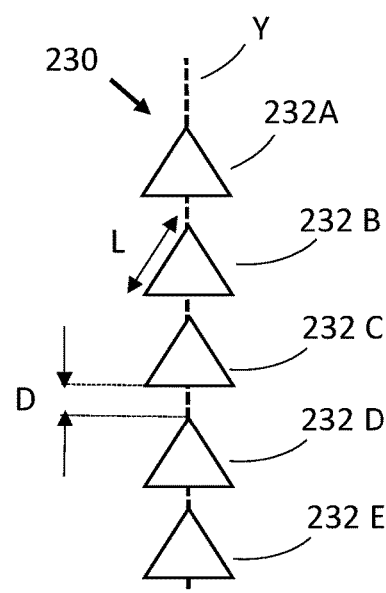
FIG. 2D schematically depicts a localized group of cavities of an embodiment of the optical device of FIG. 1, comprising five cavities, each cavity being shaped to have a cross-section of an isosceles triangle arranged along an interaction axis and pointing to a same direction, forming a pentamer.

FIG. 2D depicts a localized group (pentamer) 230 comprising five cavities, namely 232A-232E, each cavity is shaped to have a cross-section of an isosceles triangle. Pentamer 230 is different from localized groups 200, 210 and 220 described above, because the cavities 232A-232E are arranged along an axis of interaction Y, the triangles all pointing in a same direction, along the axis Y. In other words, pentamer 230 does not demonstrate two (or more) polygonal cavities having their bases facing a central metallic region in between. The length L and the distance D in pentamer 230 may be generally similar to their equivalents length L and distance D in the embodiments of FIGS. 2A, 2B and 2C. The distance D between the triangles is the shortest distance between two nearest points of the two adjacent cavities, which in this embodiment are the base of the first triangle and the vertex of the second triangle.

Figure 3A:
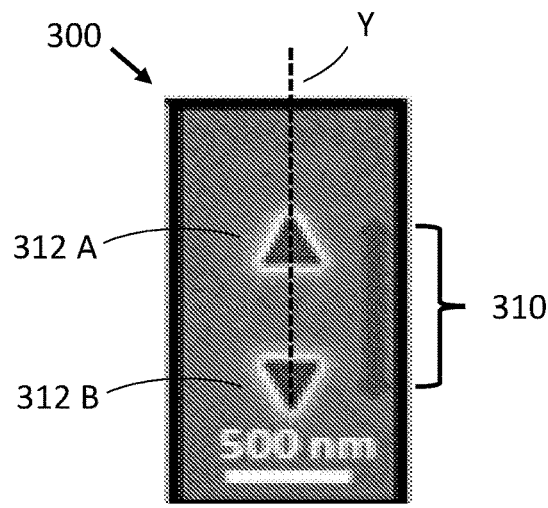
FIG. 3A schematically depicts a Scanning Electron Microscope (SEM) image of an embodiment of an optical device with a dimer according an aspect of the invention.

FIG. 3A schematically depicts a Scanning Electron Microscope (SEM) image of an embodiment of an optical device 300, similar to the optical device depicted in FIG. 1 with a dimer 310 similar to the dimer of FIG. 2A arranged along the interaction axis Y. Optical device 300 comprises a 200 nm thick metallic layer of Ag, disposed (coated) using sputtering under argon flow on a 170 um thick transparent substrate made of SiO₂. Cavities 312A and 312B are milled through the metallic layer using a Focused Ion Beam (FIB) instrument, to have an isosceles triangular cross section, with a triangle side length L of about 200 nm. The distance D between the triangles is about 400 nm. After milling, the metal layer was spin-coated with a 100 nm dielectric layer of transparent polyvinyl alcohol (PVA). Without wishing to being bound by theory or mechanism of action, the dielectric layer is applied onto the metallic layer to ensure similarity between refractive indices of the top side and the bottom side of the metallic layer. PVA was chosen because its refractive index matches the refractive index of glass (about 1.5) in the relevant wavelength region (visible to near IR). Without further wishing to being bound by theory or mechanism of action, the dielectric transparent layer applied to the metallic layer can protect and prevent the top side of the metallic layer from oxidization and aging.

Figure 3B:
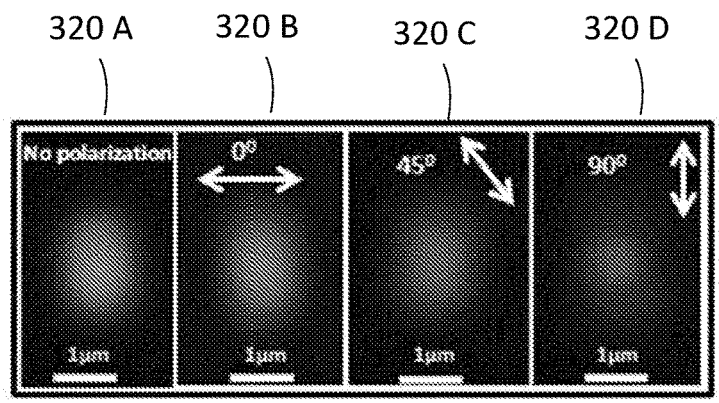
FIG. 3B schematically shows black-and-white representations of four optical transmission color micrographs of the optical device of FIG. 3A under white light having different polarization conditions.
Figure 3C:
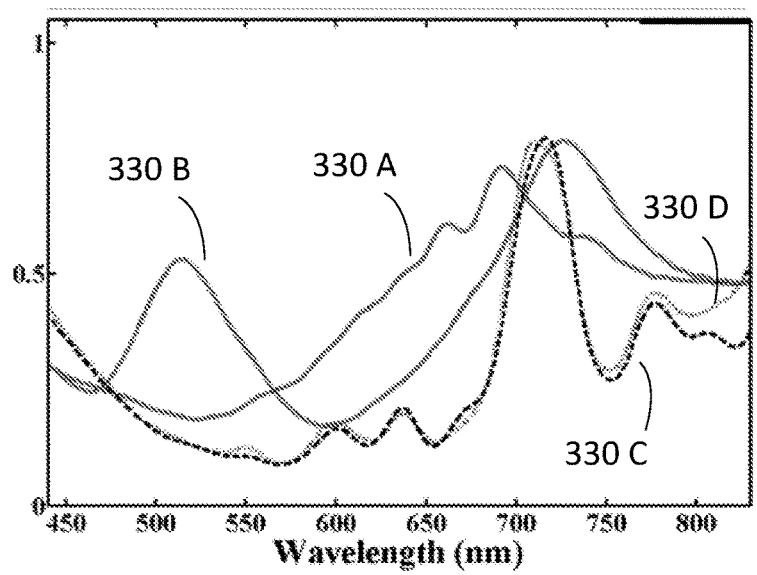
FIG. 3C graphically depicts measurement results of transmission spectra through the optical device of FIG. 3A.

FIG. 3B schematically shows black-and-white representations of four optical transmission color micrographs 320A-320D of optical device 300 under white light having different polarization conditions. The optical device is illuminated from the PVA side of the optical device, and the transmission micrographs are taken from the transparent substrate side (it is noted that illuminating the optical device from the transparent substrate side results in the same color generation, as described herein, on the PVA side). Micrograph 320A is taken under unpolarized light, and shows a light spot having a generally yellow color with reddish rims. Micrograph 320B is taken under light polarized perpendicularly to the interaction axis Y, and shows a light spot having a generally reddish color. Micrograph 320C is taken under light polarized at 45 degrees to the interaction axis Y, and shows a light spot having a generally orange-brown color. Micrograph 320D is taken under light polarized parallel to the interaction axis Y, and shows a light spot having a generally green color. FIG. 3C schematically depicts four curves 330A-330D representing four measurement results of transmission spectra. The curves show the measured intensity in arbitrary units as a function of the measured wavelength. Curve 330A corresponds to light polarized perpendicularly to the interaction axis Y (as in micrograph 320B). Curve 330B corresponds to light polarized parallel to the interaction axis Y (as in micrograph 320D). Curves 330C and 330D correspond to two transmission measurement results through only a single triangular cavity, of light polarized along two directions respectively, being perpendicular to each other. The curves show that the observed peak (mode) at about 500 nm (shown clearly in curve 330B) transmitted through optical device 300 (as opposed to light transmitted through a single triangular cavity) is strongly dependent on the polarization state of the incoming light.

FIG. 4A schematically shows black-and-white representations of six optical transmission color micrographs 340A-340F. The micrographs are taken for six optical devices of the invention, respectively, with the dimer 200 of FIG. 2A, having six different distances D, respectively, between the triangular cavities. The transmission micrographs are taken when the optical devices are illuminated by white polarized light whereas the polarization is parallel to the interaction axis Y of the dimer. As in the measurements described above, the optical devices are illuminated from the PVA side, and the transmission micrographs are taken from the transparent substrate side. Table 1 summarizes the transmission results.

TABLE 1 transmission results for six optical devices of the invention, with the dimer 200 of FIG. 2A

| | Micrograph | D [nm] | color |
|---|---|---|---|
| 1 | 340A | 280 | Magenta |
| 2 | 340B | 340 | Blue |
| 3 | 340C | 400 | Green |
| 4 | 340D | 520 | Orange-brown |

TABLE 1-continued transmission results for six optical devices of the invention, with the dimer 200 of FIG. 2A

| | Micrograph | D [nm] | color |
|---|---|---|---|
| 5 | 340E | 700 | Red |
| 6 | 340F | 760 | Split shape and multicolor |

It is noted, generally, that the dielectric layer (e.g. the PVA) causes the entire spectra to red shift by a factor of ~1.5, compared to the resulting spectrum that would have been obtained without the coating, namely via direct metal-air optical interface, in accordance with theoretical calculated frequency shift and associated numerical simulations.

FIG. 4B schematically shows a representative transmission micrograph of the dimeric optical device under white light in a linear polarization orthogonal to the cavities interaction axis, showing a reddish spot. Similar colors are obtained for all the (PVA coated) optical devices represented in FIG. 4A under the same conditions.

FIG. 4C schematically shows a transmission micrograph of an embodiment of a micro RGB pixel 350 displayed over its SEM image (nano cavities), having a total maximal dimension of less than about 2 um, comprising three dimers, 352A, 352B and 352C, respectively, having different distance D from one another. The transmission micrograph is taken when the RGB pixel 350 is illuminated by a white light, whereas the three dimers 352A, 352B and 352C transmit red, blue and green light, respectively. A notable consequence of interaction between the nano-cavities is the demonstrated enhanced transmission of light at the far field, through the "opaque" area (equivalent to central area 204 in FIG. 2A) in between the cavities. Without wishing to being bound by theory or mechanism of action, the inventors believe that the distance between each two triangular cavities along an interaction axis determines the mode wavelength, and the polarization state of the incoming field enhances or suppresses this mode, thereby generating different colors. The observed color is confined to a pixel size of less than 1 micron and is dynamically controlled by tuning the polarization state of the incoming white field.

FIGS. 4D and 4E show a low magnification transmission micrograph of the micro RGB pixel 350 illuminated by white light, polarized parallel and orthogonal polarizations, respectively, to the interaction axis Y of the dimers. FIG. 4D shows a green spot and FIG. 4E shows a red spot that shows that at low numerical apertures or magnifications, the micro RGB pixel 350 creates one total color which can change depending on polarization of incoming light.

FIG. 4F schematically depicts another embodiment of a micro-RGB pixel 360, comprising six isosceles triangular cavities (dimensioned as detailed above) arranged in a dagger configuration. Two central triangular cavities are arranged in a central dimer-like configuration 362, along a major axis of interaction Y, the triangles pointing in opposite directions from one another, so that their bases face each other, distanced from one another by a first distance D1. Four corner triangular cavities are arranged around the central two cavities, forming four dimer-like configurations with the central cavities 364A-364B and 366A-366B, respectively, along four minor axes X1-X4, respectively. Two of the four corner dimers, 364A and 364B have a dimer distance D2 and the other two corner dimers 366A and 366B have a dimmer distance D3. In the exemplary micro RGB pixel 360, D1=600 nm, D2=400 nm and D3=340 nm.

Figure 4G:
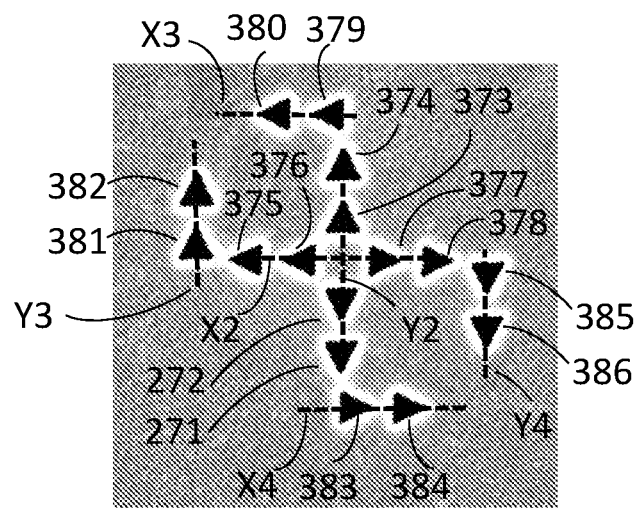
FIG. 4G schematically depicts an SEM image of another embodiment of a micro-RGB pixel, comprising sixteen isosceles triangular cavities arranged in a star-like configuration.

FIG. 4G schematically depicts a SEM image of another embodiment of a micro-RGB pixel 370, comprising sixteen isosceles triangular cavities (dimensioned as detailed above) arranged in a star-like configuration. Micro-RGB pixel 370 comprises a combination of an octamer, as schematically depicted in FIG. 2C and four dimers, wherein inside each dimer all triangles point in a same direction. In particular, cavities 371, 372, 373, 374, 375, 376, 377, and 378 form an octamer, Cavities 371, 372, 373, and 374 are arranged along interaction axis Y2 and cavities 375, 376, 377, and 378 are arranged along interaction axis X2. Cavities 379 and 380 form one dimer, wherein cavity 379 is adjacent to cavity 374. Cavities 379 and 380 are arranged along interaction axis X3, which is orthogonal to interaction axis Y2. Cavities 381 and 382 form one dimer, wherein cavity 381 is adjacent to cavity 375. Cavities 381 and 382 are arranged along interaction axis Y3, which is orthogonal to interaction axis X2. Cavities 383 and 384 form one dimer, wherein cavity 383 is adjacent to cavity 371. Cavities 383 and 384 are arranged along interaction axis X4, which is orthogonal to interaction axis Y2. Cavities 385 and 386 form one dimer, wherein cavity 385 is adjacent to cavity 378. Cavities 385 and 386 are arranged along interaction axis Y4, which is orthogonal to interaction axis X2.

Figure 4H:
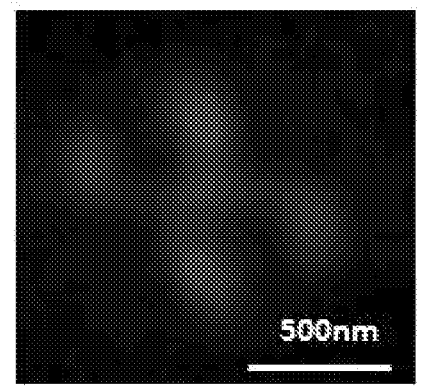
FIG. 4H shows a low magnification transmission micrograph of the micro RGB pixel of FIG. 4G illuminated by unpolarized white light displayed over the SEM image of FIG. 4G.
Figure 4I:
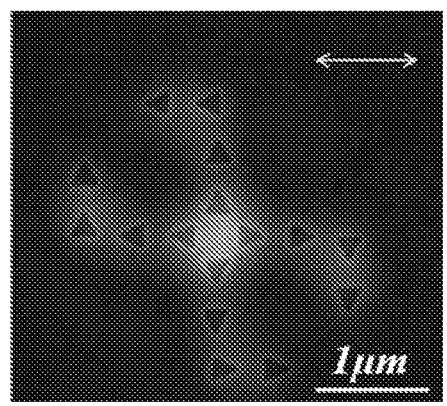
FIG. 4I shows a low magnification transmission micrograph of the micro RGB pixel of FIG. 4G illuminated by white light polarized in parallel to interaction axis X2, displayed over the SEM image of FIG. 4G.
Figure 4J:
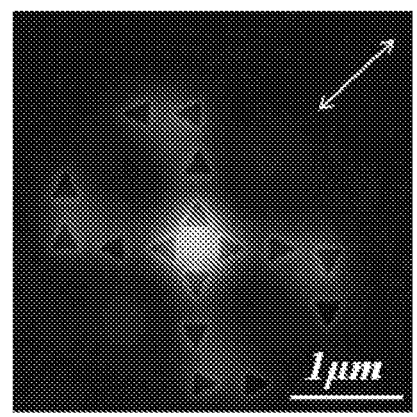
FIG. 4J shows a low magnification transmission micrograph of the micro RGB pixel of FIG. 4G illuminated by white light polarized at 45 degrees to interaction axis X2, displayed over the SEM image of FIG. 4G.
Figure 4K:
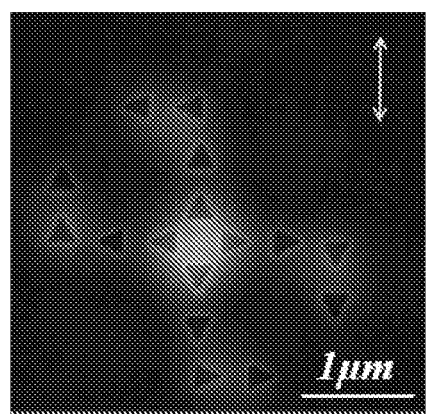
FIG. 4K shows a low magnification transmission micrograph of the micro RGB pixel of FIG. 4G illuminated by white light polarized orthogonally to interaction axis X2, displayed over the SEM image of FIG. 4G.
Figure 4L:
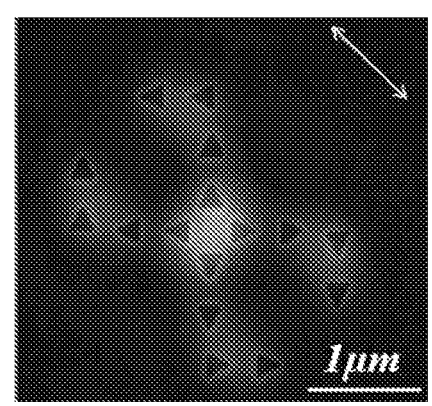
FIG. 4L shows a low magnification transmission micrograph of the micro RGB pixel of FIG. 4G illuminated by white light polarized at 315 degrees to interaction axis X2, displayed over the SEM image of FIG. 4G.

FIG. 4H shows a black-and-white representation of a color transmission micrograph of micro RGB pixel 370 illuminated by unpolarized white light. FIGS. 4I-4L show black-and-white representations of a color transmission micrograph of micro RGB pixel 370 displayed over its SEM image, illuminated by polarized white light. In FIG. 4I white light is polarized in parallel to interaction axis X2, in FIG. 4J white light is polarized at 45 degrees to interaction axis X2, in FIG. 4K white light is polarized orthogonally to interaction axis X2, and in FIG. 4K white light is polarized at 315 degrees to interaction axis X2. Different polarization states allow generating different colors throughout the pixel area. In particular, under polarization parallel to interaction axis X2, all the triangles with inter-triangle axis pointing to said direction, had green color, and all the triangles with inter-triangle axis pointing to the direction of Y2 are red, such that there are two colors in a few different regions at the same pixel at the same time. The color of said areas changes with changing the polarization angle such that all the triangles that were red become green, and vice versa.

Figure 5A:
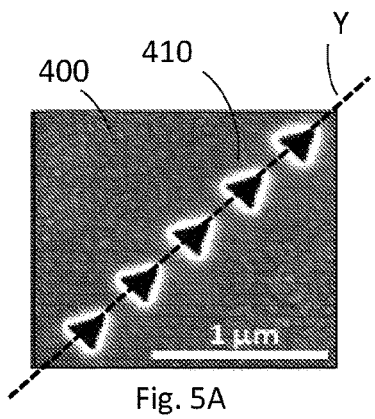
FIG. 5A schematically depicts a SEM image of an embodiment of an optical device according to an aspect of the invention, with the pentamer of FIG. 2D.
Figure 5B:
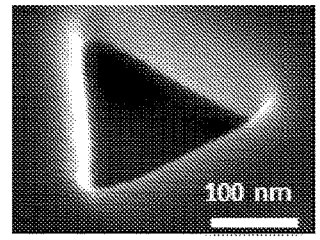
FIG. 5B schematically depicts a SEM image of a single triangular cavity of the pentamer of FIG. 5A in a tilted view.
Figure 5C:
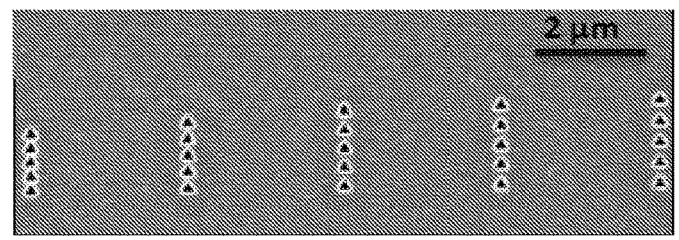
FIG. 5C schematically depicts a SEM image of five different pentamers which are different from one another by the distance between cavities.

FIG. 5A schematically depicts a SEM image of an optical device 400 such as optical device 100 comprising a pentamer 410 similar to the pentamer as depicted in FIG. 2D arranged along the interaction axis Y. Optical device 400 comprises a 200 nm thick metallic layer of Ag, disposed on a transparent substrate made of $SiO_2$. The cavities are milled through the metallic layer using a Focused Ion Beam (FIB) instrument, to have an isosceles triangular cross section, with a triangle side length L of about 200 nm. After milling, the metal layer is spin-coated with a 100 nm layer of transparent polyvinyl alcohol (PVA). FIG. 5B schematically depicts a SEM image of a single triangular cavity of the pentamer in a tilted view. FIG. 5C schematically depicts a SEM image of five different pentamers which are different from one another by the distance D between cavities.

Figure 5D:
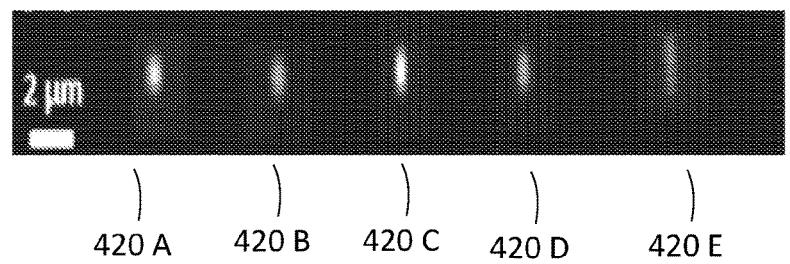
FIG. 5D schematically shows 5 black-and-white representations of color transmission micrographs taken with 5 different optical devices such as the optical device of FIG. 5A with 5 different distances between cavities, respectively.

FIG. 5D schematically shows 5 black-and-white representations of color transmission micrographs 420A, 420B, 420C, 420D and 420E, taken with 5 different optical devices 400 with pentamers having, respectively, distances D between cavities of 130 nm, 180 nm, 230 nm, 250 nm and 830 nm. The optical devices are illuminated from the PVA side, with unpolarized white light. Table 2 summarizes the transmission results.

TABLE 2 transmission results of 5 different optical devices 400 with pentamers having, respectively, distances D between cavities of 130 nm, 180 nm, 230 nm, 250 nm and 830 nm

| | Micrograph | D [nm] | color |
|---|---|---|---|
| 1 | 420A | 130 | Pink |
| 2 | 420B | 180 | Magenta |
| 3 | 420C | 230 | Brown |
| 4 | 420D | 250 | Green |
| 5 | 420E | 830 | Red |

Figure 5E:
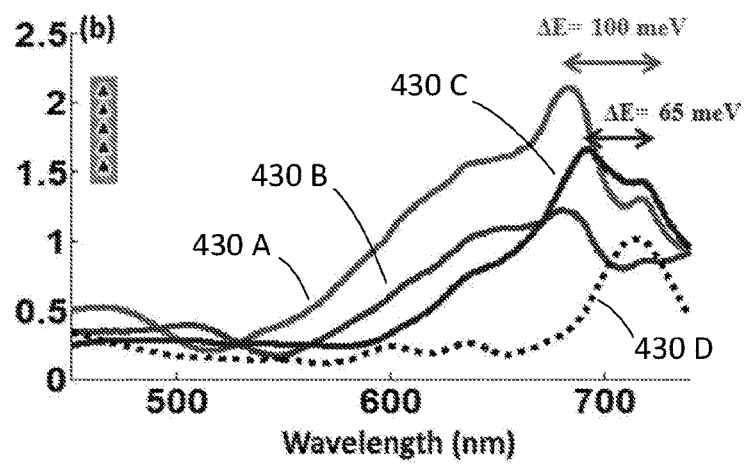
FIG. 5E graphically depicts measurement results of transmission spectra through some of the optical devices of FIG. 5D.

FIG. 5E schematically depicts four curves 430A-430D representing four measurement results of transmission spectra. The curves show the measured intensity in arbitrary units as a function of the measured wavelength. Curves 430A-430C correspond to transmission spectra of pentamers having distances D of 130 nm, 180 nm and 230 nm, respectively (corresponding to micrographs 420A-420C). Curve 430D corresponds to transmission measurement results through only a single triangular cavity.

FIGS. 6A, 6B and 6C schematically show black-and-white representations of color transmission micrographs of the three optical devices, as described above, having pentamers with distances D of 130 nm, 180 nm and 230 nm, respectively. In each figure, the top line of spots represent micrographs taken with polarized white light and the bottom line of spots represent micrographs taken with unpolarized white light. Each figure shows the results for 5 different angles—namely 0, 30, 45, 60 and 90 degrees—between the polarization direction indicated by the arrow at the top-left corner of the figure and the interaction axis Y of the pentamer, as is indicated by the pentamers arrangement at the bottom of the figures. All the spots corresponding to unpolarized light with the same pentamer have the same color namely pink in FIG. 6A, magenta in FIG. 6B and brown in FIG. 6C. The spots that correspond to polarized light vary in color both as a function of the relative angle between the polarization direction and the interaction axis, as well as a function of the distance D of the respective pentamer.

FIGS. 6D, 6E and 6F schematically depict measurement results of transmission spectra for the three pentamers of FIGS. 6A-6C, respectively. Each Figure schematically depicts two curves, namely 510A and 510B, 520A and 520B and 530A and 530B, respectively corresponding to two different polarization directions relative to the interaction axes of the pentamers. Curves 510A, 520A and 530A correspond to parallel polarization direction, and, curves 510B, 520B and 530B correspond to perpendicular polarization direction. The observed spectra show optical regions over which light transmission is either suppressed or enhanced, depending on the polarization state of the incident light relative to the interaction axis, and depending on the distance D.

Figure 7A:
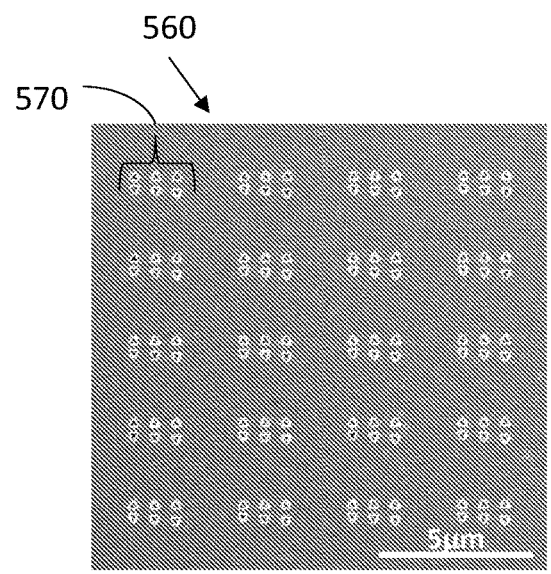
FIG. 7A schematically depicts a SEM image of an embodiment of a portion of an optical device, comprising hexamers composed of three dimers of FIG. 2A.
Figure 7B:
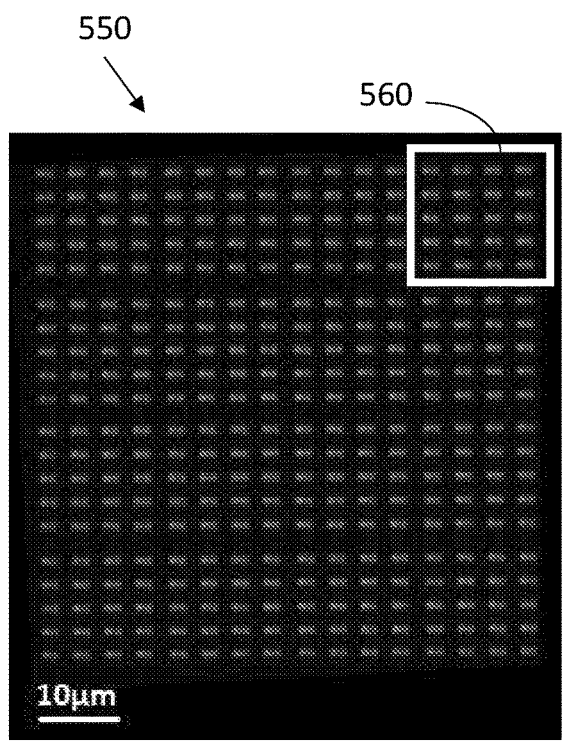
FIG. 7B schematically shows a black-and-white representation of color transmission micrographs of the optical device of FIG. 7A, comprising a plurality of hexamer localized groups of cavities and illuminated by white light, polarized parallel to the interaction axis of the dimers, and obtaining multicolor pixels.
Figure 7C:
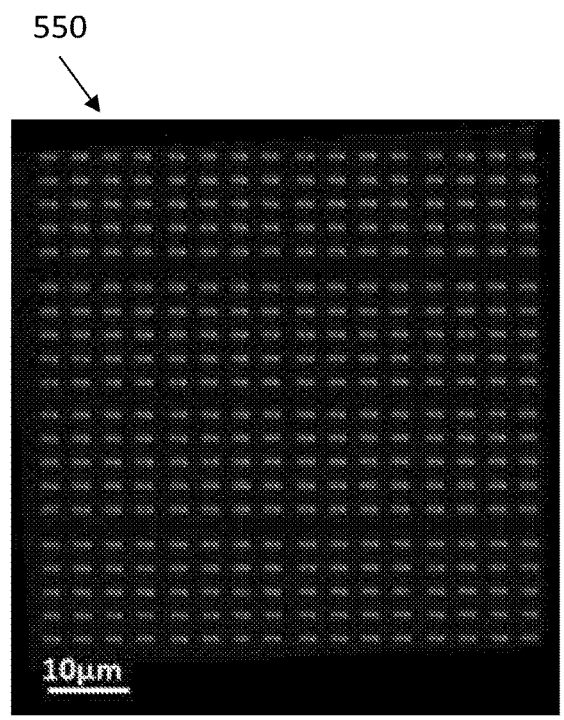
FIG. 7C schematically shows a black-and-white representation of color transmission micrographs of the optical device of FIG. 7A, comprising a plurality of hexamer localized groups of cavities and illuminated by white light, polarized orthogonally to the interaction axis of the dimers, and obtaining red pixels.

FIG. 7A shows a SEM image of portion 560 of optical device 550 comprising localized group 570 of cavities. Each localized group 570 of cavities is a hexamer comprising three dimers, as schematically shown in FIG. 2A and arranged in parallel to each other. FIG. 7B shows a black and white representation of the transmission micrograph taken under white light polarized in parallel to the interaction axes of the dimers of localized groups 570 of optical device 550. FIG. 7C shows a black and white representation of the transmission micrograph taken under white light polarized orthogonally to the interaction axes of the dimers of localized groups 570 of optical device 550. The change in the polarization state from parallel to orthogonal results in change in the pixels' color of all the localized groups 570 of cavities from red-blue-green to red only.

FIGS. 8A and 8B depict schematically an opto-chemical sensor 600 in a cross-sectional side view, and in a partially-exploded cross-sectional side view, respectively. Opto-chemical sensor 600 comprises a sensing surface 602 configured to chemically selectively bind to molecules of one or more predetermined analytes. Opto-chemical sensor 600 comprises the optical device 100 with metallic layer 120 disposed above transparent substrate 110. Metallic layer 120 comprises a localized group 130 of cavities 140. Opto-chemical sensor 600 further comprises a sensor layer 610 above metallic layer 120, the sensor layer 610 comprising the sensing surface 602 on top, facing away from the metallic layer. Opto-chemical sensor 600 may further include a binding layer 620 between metallic layer 120 and sensor layer 610, configured to bind sensor layer 610 to metallic layer 120. Binding layer 620 and sensor layer 610 are transparent in the intended range of wavelengths to be used.

Without wishing to being bound by theory or mechanism of action, it is contemplated that upon the binding of the analyte molecules to sensing surface 602, the refractive index of the sensing surface 602 changes, which can affect the wavelength of the electromagnetic radiation generated by localized group 130 of cavities 140. Opto-chemical sensor 600 is thereby configured to detect the presence of molecules of the pre-determined analytes dispensed in a fluid (liquid or gas) by providing a unique optical signal in response to the binding of such molecules to the sensing surface.

According to a non-limiting example, an embodiment of opto-chemical sensor 600 may be configured for detecting explosives such as trinitrotoluene (TNT); 1,3,5-trinitrobenzene (1,3,5-TNB); and 1,3-dinitrobenzene (1,3-DNB). According to some embodiments, opto-chemical sensor 600 is further configured to detect herbicides, such as, for example, alachlor. According to some embodiments, opto-chemical sensor 600 is further configured to selectively determine the detected analyte. According to additional embodiments, opto-chemical sensor 600 is further configured to quantitatively determine the predefined analyte.

According to some embodiments a binding layer 620A of silanol (SiOH) is obtained by deposition of a 5-7 nm thick layer of silica ($SiO_2$) on metallic layer 120, e.g. using Atomic Layer Deposition (ALD), followed by activating the silica to generate the silanol layer, e.g. by oxygen plasma treatment. A sensor layer 610 comprising high affinity receptors, may then be disposed on binding layer 620A. For example a monolayer 610A of amino-propyl-tri-ethoxysilane (APTES) may be covalently attached to the silanol groups of binding layer 620A. When in use, opto-chemical sensor 600 may be submerged in a fluid (liquid or gas) suspected of containing molecules of any of the detectable substances (TNT, TNB or DNB). Molecules of any of these substances suspended in the fluid may electrostatically adhere to the sensor surface 602, namely to the APTES receptors, e.g. by forming a Meisenheimer complex, as depicted in FIG. 8C.

Figure 8D:
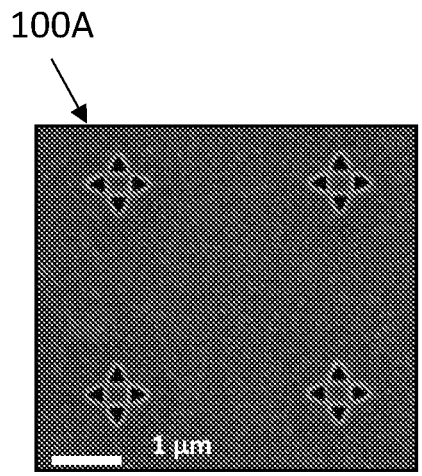
FIG. 8D depicts a SEM image of an opto-chemical sensor comprising an embodiment of the optical device of the invention having a tetramer structure schematically depicted in FIG. 2B.
Figure 8E:
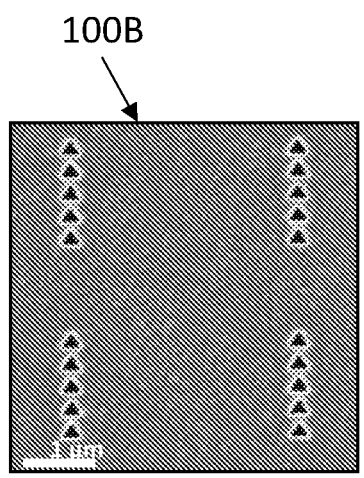
FIG. 8E depicts a SEM image of an opto-chemical sensor comprising an embodiment of the optical device of the invention having a pentamer structure schematically depicted in FIG. 2D.

FIG. 8D depicts a SEM image of a portion of an opto-chemical sensor comprising optical device 100A comprising a plurality of identical localized groups of cavities having tetramer shapes, as schematically depicted in FIG. 2B. FIG. 8E depicts a SEM image of a portion of an opto-chemical sensor comprising optical device 100B comprising a plurality of identical localized groups of cavities having pentamer shapes, as schematically depicted in FIG. 2D. Without wishing to being bound by theory or mechanism of action, it is contemplated that the use of the plurality of identical localized groups of cavities enhances sensitivity of the opto-chemical sensor. The opto-chemical sensor can further include a plurality of localized groups having different parameters than those shown in FIGS. 8D and 8E.

Figure 8F:
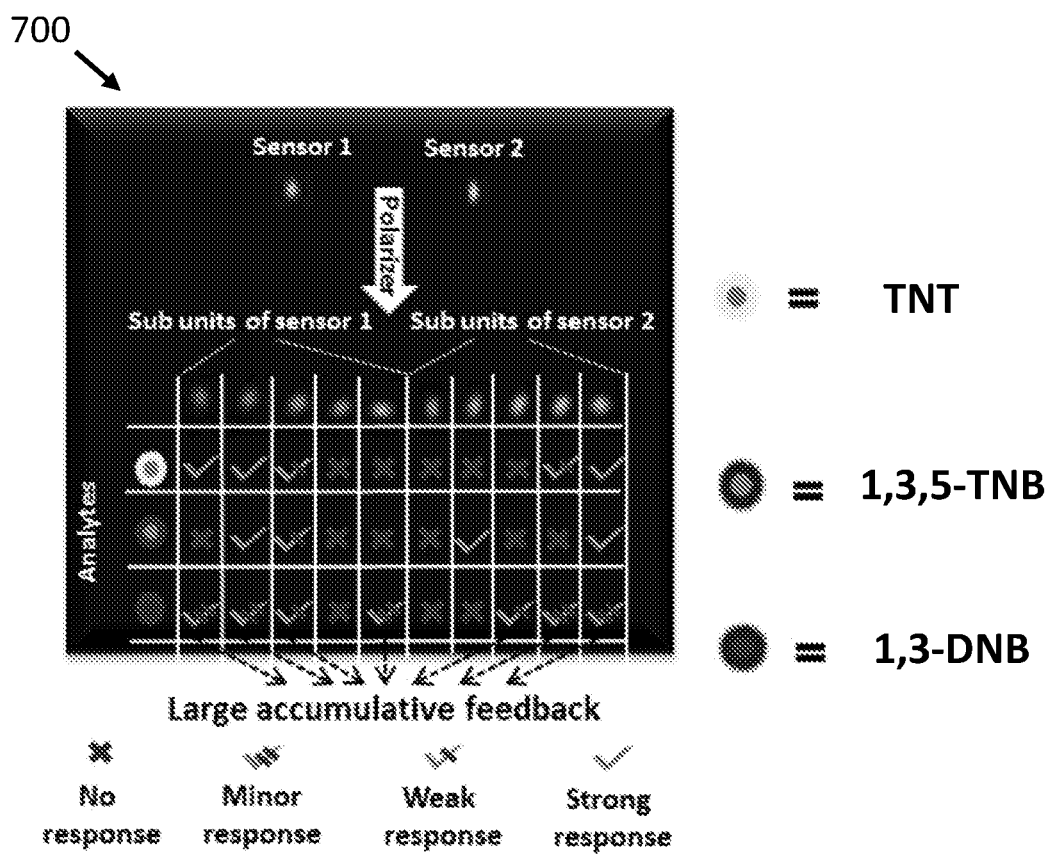
FIG. 8F schematically depicts a comparative table schematically showing theoretical results of implementing the chemical sensors of FIGS. 8D and 8E for detecting three explosive substances.

FIG. 8F schematically depicts a comparative table 700 showing theoretical results of implementing an opto-chemical sensor comprising optical devices 100A (termed sensor 1 in table 700) and 100B (termed sensor 2 in table 700, as depicted in FIGS. 8D and 8E, respectively), for the explosive substances mentioned above. The presence of an analyte molecule on sensing surface 602 and proximal a localized group of cavities thereof may alter the optical characteristics of the layer, thereby changing the characteristics of the transmitted light through the device, e.g. following illuminating the device with polarized light.

Table 700 indicates the strength of detection signal and color which is obtained for each localized group of cavities in the tetramer- or pentamer-based sensors with and without an analyte, which is attached to the sensor surface 602 proximal to the respective localized group of cavities. The detection signal is defined as the difference between the light signal obtained from the respective localized group of cavities before and after the attachment of the substance. In other words, when the optical signal obtained from the pentamer or tetramer after attachment of the substance is similar to the signal obtained prior to the attachment, the detection signal is said to be weak or non-existing, whereas when the difference is large the detection signal is correspondingly large too. The electromagnetic radiation spectra obtained upon detection of a specific known analyte by a specific sensor can be used to compile a library (also termed herein "stored data") of spectra sets. Said library can be used to determine the unknown analyte by comparing the electromagnetic radiation generated by the sensor in the presence of said analyte to the different spectra sets and finding a closest match between the generated radiation and one of the spectra sets. Polarization state of the incoming electromagnetic radiation, which illuminates the opto-chemical sensor can be changed in order to change the optical characteristics of the localized groups of cavities (wavelength and/or intensity of the generated electromagnetic radiation), thereby allowing identification of additional analytes. The sensing results under different polarization states can also be included in the library (or stored data).

It is noted that opto-chemical sensor 600 may be constructed with other optical devices of the invention, e.g. using dimers, star-like structures, octamers or yet other arrangements of cavities. It is further noted that one advantage of opto-chemical sensor 600 is having a relatively large active area suitable for sensing, because a substance may cause an optical effect, thereby allowing the detection thereof, even if a respective molecule is attached to the sensing surface near a cavity and not necessarily directly above a cavity of the optical device. Hence by utilizing a suitably dense array of localized groups of cavities according to the teachings herein, the detection efficiency, and in particular, sensitivity, may be maintained relatively high.

Figure 9A:
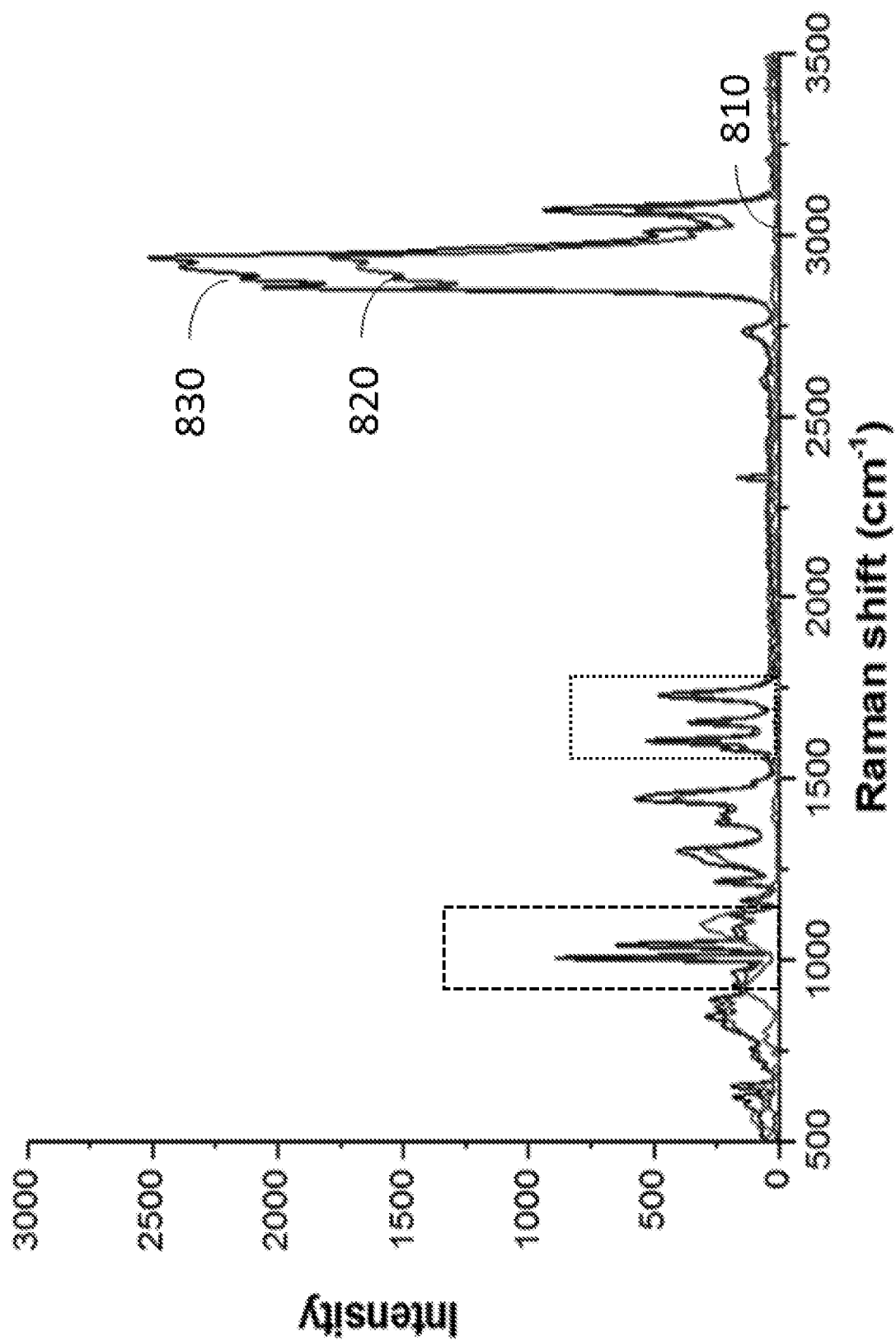
FIG. 9A shows the enhanced Raman spectra of $3\times10^{-7}$ M alachlor analyte detected by a regular glass reference, an opto-chemical sensor comprising an embodiment of the optical device of the invention having a pentamer structure depicted in FIG. 8E and an opto-chemical sensor comprising an embodiment of the optical device of the invention having a tetramer structure depicted in FIG. 8D.
Figure 9B:
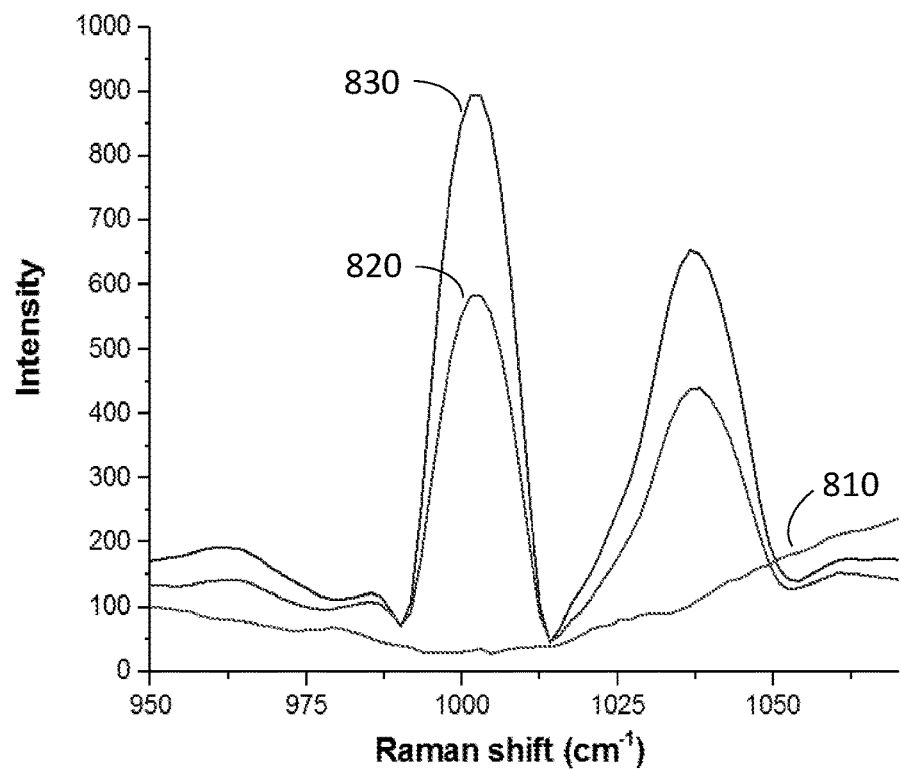
FIG. 9B shows a random spectral region of the enhanced Raman spectra depicted in FIG. 9A, showing the strong enhancement of the signal provided by the optical device of the invention.
Figure 9C:
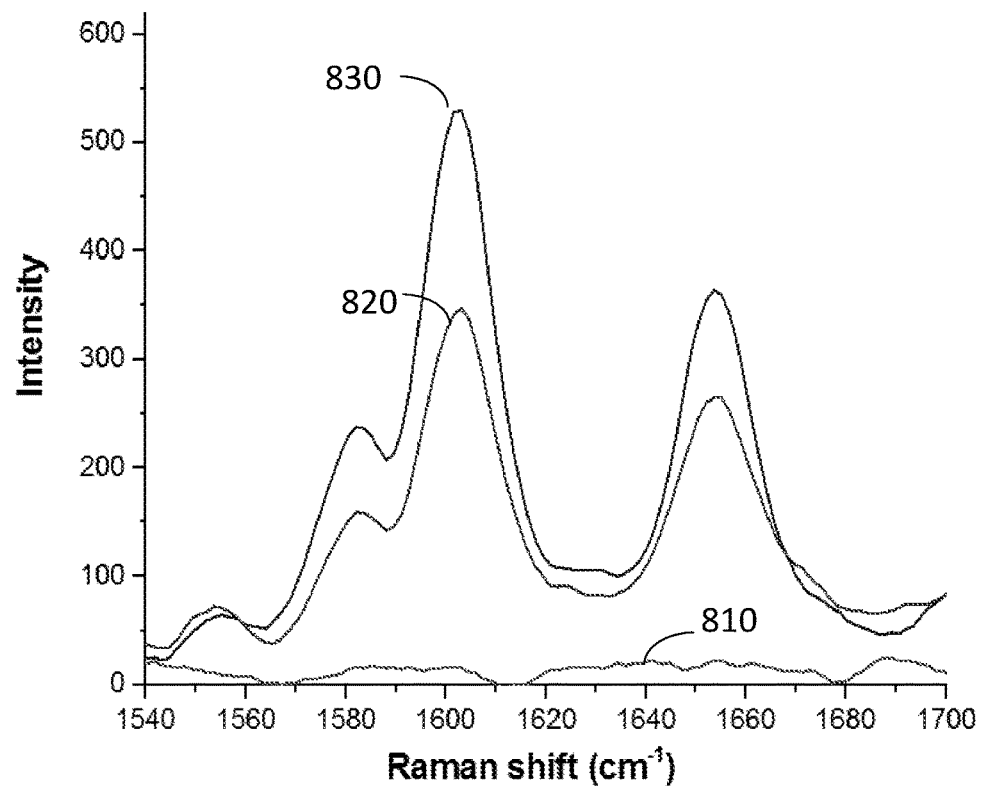
FIG. 9C shows a random spectral region of the enhanced Raman spectra depicted in FIG. 9A, showing the strong enhancement of the signal provided by the optical device of the invention.

According to a non-limiting example, an embodiment of opto-chemical sensor 600 may be configured for generating electromagnetic radiation detectable by Raman spectroscopy. FIG. 9A depicts the enhanced Raman spectra of $3 \times 10^{-7}$ M alachlor analyte when sensed on a regular glass reference (spectral line 810), opto-chemical sensor 600 comprising optical device 100A having pentamer-shaped localized groups of cavities, as depicted in FIG. 8E (spectral line 820), and opto-chemical sensor 600 comprising optical device 100B having tetramer-shaped localized groups of cavities, as depicted in FIG. 8D (spectral line 830). FIGS. 9B and 9C are random spectral regions of FIG. 9A, showing the strong enhancement. The enhancement factor of the detection of the analyte by sensor 600, as compared to bulk analyte ($3 \times 10^{-3}$ M) on glass is more than 3 orders of magnitude. Concentration of $3 \times 10^{-7}$ M cannot be detected by Raman spectroscopy on glass, as it is present on the spectrum as diminished background noise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

Although steps of methods according to some embodiments may be described in a specific sequence, methods of the invention may comprise some or all of the described steps carried out in a different order. A method of the invention may comprise all of the steps described or only a few of the described steps. No particular step in a disclosed method is to be considered an essential step of that method, unless explicitly specified as such.

Although the invention is described in conjunction with specific embodiments thereof, it is evident that numerous alternatives, modifications and variations that are apparent to those skilled in the art may exist. Accordingly, the invention embraces all such alternatives, modifications and variations that fall within the scope of the appended claims. It is to be understood that the invention is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the invention. Section headings are used herein to ease understanding of the specification and should not be construed as necessarily limiting.

The invention claimed is:

1. An optical device comprising
a dielectric transparent substrate, and
a metallic layer having a thickness between about 20 nm and about 1000 nm disposed on said substrate and comprising at least one localized group of cavities, each localized group being confined within a diameter smaller than about 5 um, and each localized group comprising at least two cavities, with a distance between two adjacent cavities in said localized group being between about 100 nm and about 2000 nm, each cavity in said localized group being shaped as a through-hole in said metallic layer, said through-hole having a polygonal cross-section having a polygon side length between 50 nm and 2000 nm,
wherein said localized group comprises at least a first pair of triangular cavities, arranged to have their bases arranged around a central point in between the triangles thereby defining a central metallic region there between.

2. The optical device of claim 1, wherein said first pair of triangular cavities is arranged along a first interaction axis, with the first pair of triangular cavities pointing to opposite directions from one another thereby having their bases facing each other thereby defining said central metallic region there between.

3. The optical device of claim 2, wherein said localized group further comprises a second pair of triangular cavities, with the second pair of triangular cavities pointing to opposite directions from one another and arranged along a second interaction axis, perpendicular to said first interaction axis.

4. The optical device of claim 1, wherein the diameter of the localized group of cavities is smaller than about 2 μm.

5. The optical device of claim 1, wherein the at least one localized group of cavities generates one color pixel, wherein the color pixel has a diameter, which corresponds to the diameter of said at least one localized group.

6. The optical device of claim 1, wherein the metallic layer comprises a metal selected from the group consisting of Ag, Al, Au and Cu.

7. The optical device of claim 1, wherein said at least one localized group comprises a plurality of localized groups arranged in an array, wherein said distance between two adjacent cavities in said localized group is smaller than a distance between two different localized groups.

8. The optical device of claim 7, wherein the plurality of localized groups are identical to each other.

9. The optical device of claim 7, wherein the plurality of localized groups have different distances between two adjacent cavities in the localized group or different diameters or wherein the plurality of localized groups have different polygon side lengths of the cavities in the localized group.

10. The optical device of claim 1, configured for use as a dynamic color generator, dynamic color sorter, opto-chemical sensor, a light coherent convertor, or an illumination device.

11. A system comprising the optical device of claim 1, and at least one of a polarizer, a source of electromagnetic radiation, microscope, spectrograph, spectrometer, monochromator, filter, and camera.

12. A dynamic color generator, comprising the optical device of claim 1, comprising a plurality of localized groups of cavities; a source of electromagnetic radiation; and a polarizer, wherein at least a portion of the localized groups of cavities have different distances between two adjacent cavities in the localized group.

13. A sensing system, comprising the optical device of claim 1, comprising a plurality of localized groups of cavities; a polarizer; and an optical pattern recognition analyzer.

14. The sensing system of claim 13, wherein the optical device comprises a sensor layer configured to bind analyte molecules.

15. The sensing system of claim 13, wherein the optical pattern recognition analyzer comprises at least one of a microscope, a spectrophotometer, a spectrograph, and a camera and wherein the optical pattern recognition analyzer further comprises a processing unit, which compares electromagnetic radiation generated by the localized groups of cavities to stored data.

16. A method of detecting an analyte, comprising the steps of:
(a) providing the sensing system of claim 13;

(b) exposing the optical device to a test sample;
(c) detecting electromagnetic radiation generated by the localized groups using the optical pattern analyzer;
(d) comparing the electromagnetic radiation using the optical pattern analyzer to stored data.

17. The method of claim 16, wherein the analyte is selected from the group consisting of a herbicide, pesticide, explosive, volatile organic compound, and disease biomarker.

* * * * *